US012771551B2

(12) United States Patent
Pan et al.

(10) Patent No.: US 12,771,551 B2
(45) Date of Patent: Oct. 20, 2026

(54) COMMUNICATION METHOD AND COMMUNICATION APPARATUS

(71) Applicant: Yinwang Intelligent Technologies Co., Ltd., Shenzhen (CN)

(72) Inventors: Kai Pan, Shanghai (CN); Miao Yang, Beijing (CN); Mingchao Li, Beijing (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 38 days.

(21) Appl. No.: 18/400,283

(22) Filed: Dec. 29, 2023

(65) Prior Publication Data

US 2024/0137224 A1 Apr. 25, 2024
US 2024/0235844 A9 Jul. 11, 2024

Related U.S. Application Data

(63) Continuation of application No. PCT/CN2022/101646, filed on Jun. 27, 2022.

(30) Foreign Application Priority Data

Jun. 30, 2021 (CN) ......................... 202110745084.1

(51) Int. Cl.
*H04L 9/32* (2006.01)
*H04L 9/06* (2006.01)
*H04L 9/14* (2006.01)

(52) U.S. Cl.
CPC .......... *H04L 9/3242* (2013.01); *H04L 9/0618* (2013.01); *H04L 9/14* (2013.01)

(58) Field of Classification Search
CPC ............ G07B 15/063; H04L 2101/622; H04L 61/5046; H04L 67/12; H04L 9/0618;
(Continued)

(56) References Cited

U.S. PATENT DOCUMENTS 7,246,272 B2 * 7/2007 Cabezas .............. H04L 61/5046 370/395.54
8,089,981 B2 * 1/2012 Hiraki ................. H04L 61/5038 370/445
(Continued)

FOREIGN PATENT DOCUMENTS

CN 202815938 U 3/2013
CN 107016741 A 8/2017
(Continued)

OTHER PUBLICATIONS

Translation of CN107016741A from Espacenet (Pub. 2017, Transl. Requested Nov. 19, 2025) (Year: 2017).*
(Continued)

*Primary Examiner* — Sharon S Lynch
(74) *Attorney, Agent, or Firm* — Conley Rose, P.C.

(57) ABSTRACT

In a communication method, when MAC addresses in a plurality of VSI messages conflict, in response to only some of the VSI messages, a VSI message receiving end sends an action response message carrying a conflicting MAC address. In this way, a device that can correctly decrypt the action response message can decrypt, for a few times, ciphertext information in received action-request messages using a key of the device.

24 Claims, 7 Drawing Sheets

(58) Field of Classification Search
CPC ........ H04L 9/14; H04L 9/3242; H04W 12/03; H04W 12/04; H04W 12/71; H04W 4/44; H04W 12/009; H04W 28/06; H04W 4/40
See application file for complete search history.

(56) References Cited

U.S. PATENT DOCUMENTS

| | | | | |
|---|---|---|---|---|
| 8,543,669 | B2 * | 9/2013 | Chae | H04L 61/5046 709/220 |
| 9,537,819 | B2 * | 1/2017 | Gossain | H04L 12/2803 |
| 9,681,467 | B2 * | 6/2017 | Yang | H04W 74/0816 |
| 9,794,176 | B2 * | 10/2017 | Qiang | H04L 61/5046 |
| 10,484,866 | B2 * | 11/2019 | Huang | H04W 76/14 |
| 10,979,876 | B2 * | 4/2021 | Alexander | H04W 84/005 |
| 11,496,871 | B2 * | 11/2022 | Yang | G08G 1/0116 |
| 12,425,357 | B2 * | 9/2025 | Urman | H04L 47/225 |
| 2006/0105741 | A1 | 5/2006 | Suh et al. | |
| 2008/0250123 | A1 * | 10/2008 | Chae | H04L 61/103 709/223 |
| 2009/0210141 | A1 * | 8/2009 | Young | G08G 1/0125 701/119 |
| 2012/0327938 | A1 | 12/2012 | Song | |
| 2013/0083679 | A1 | 4/2013 | Krishnaswamy et al. | |
| 2013/0279392 | A1 * | 10/2013 | Rubin | H04W 4/12 370/312 |
| 2015/0016461 | A1 * | 1/2015 | Qiang | H04L 61/5046 370/392 |
| 2016/0142287 | A1 | 5/2016 | Yang et al. | |
| 2016/0338108 | A1 * | 11/2016 | Yang | H04L 61/5038 |
| 2019/0007827 | A1 * | 1/2019 | Huang | H04W 4/00 |
| 2020/0077238 | A1 * | 3/2020 | Alexander | G01S 13/765 |
| 2021/0084460 | A1 * | 3/2021 | Yang | H04W 4/40 |
| 2021/0344555 | A1 * | 11/2021 | Peng | H04L 1/08 |
| 2021/0385169 | A1 * | 12/2021 | Urman | H04L 1/08 |
| 2023/0141041 | A1 * | 5/2023 | Iwata | H04L 12/4645 709/238 |
| 2023/0142079 | A1 * | 5/2023 | Iwata | B60R 16/023 709/238 |
| 2023/0269222 | A1 * | 8/2023 | Wu | H04L 61/5038 370/254 |
| 2024/0244408 | A1 * | 7/2024 | Li | H04L 61/5046 |

FOREIGN PATENT DOCUMENTS

| | | | |
|---|---|---|---|
| CN | 106603740 | B | 4/2019 |
| CN | 109831764 | A | 5/2019 |
| CN | 111223198 | A | 6/2020 |
| CN | 111464980 | A | 7/2020 |
| CN | 111586643 | A | 8/2020 |
| CN | 112469003 | A | 3/2021 |
| EP | 3503044 | A1 | 6/2019 |

OTHER PUBLICATIONS

Translation from Espacenet of CN112004209A (published Nov. 27, 2020) (transl. obtained May 29, 2026) (Year: 2020).*

* cited by examiner

COMMUNICATION METHOD AND COMMUNICATION APPARATUS

CROSS-REFERENCE TO RELATED APPLICATIONS

This is a continuation of International Patent Application No. PCT/CN2022/101646 filed on Jun. 27, 2022, which claims priority to Chinese Patent Application No. 202110745084.1 filed on Jun. 30, 2021. The disclosures of the aforementioned applications are hereby incorporated by reference in their entireties.

TECHNICAL FIELD

This application relates to the communication field, and more specifically, to a communication method, a communication apparatus, a computer storage medium, and a computer program product.

BACKGROUND

A wireless communication technology of the internet of vehicles implements information interaction between different subsystems in an intelligent transportation system, to facilitate different applications such as road safety, traffic efficiency, and information services. The internet of vehicles is mainly designed for broadcast communication, but the internet of vehicles can also be used for unicast communication.

An application scenario of the internet of vehicles is a near-field payment service. In a method for implementing the near-field payment service based on the internet of vehicles, an on-board unit (OBU) performs data interaction with a roadside unit (RSU), to implement an on-board payment function.

A process of interaction between the OBU and the RSU may include the following steps: The RSU broadcasts a roadside service table (RST) message. The OBU determines, based on content in the received RST message, whether to initiate a response to the RSU. If the OBU determines to initiate a response, the OBU generates a media access control (MAC) address and a symmetric key, uses the symmetric key to encrypt content that needs to be kept secret, such as a subscription serial number, vehicle information, and pass-through information, and sends the generated MAC address, the symmetric key, and the encrypted content to the RSU by using a vehicle service indication (VSI) message. The RSU decrypts the encrypted content by using the symmetric key in the VSI message to obtain charging information of a vehicle. The RSU encrypts content such as a transaction record and pass-through information by using the symmetric key, and sends the encrypted content to the OBU by using a request (action-request) message. In addition, the request message further includes the MAC address generated by the OBU. The OBU determines, based on the MAC address in the received request message, whether to process the request message. If the OBU determines to process the request message, the OBU uses the symmetric key to perform decryption and implements a subsequent process. In this way, transaction can be performed.

Through research, it is found that the following problem may occur in the foregoing interaction process. In a same time period, a plurality of OBUs send VSI messages to a same RSU, and MAC addresses generated by the plurality of OBUs may be the same, that is, an address conflict occurs. In this case, because the plurality of VSI messages have a same MAC address, a plurality of request messages responded to by the RSU also have a same MAC address. Therefore, each of the plurality of OBUs having the MAC address can successfully perform MAC address decoding on the plurality of received request messages, and decrypts the plurality of pieces of request message information by using a symmetric key of the OBU. A quantity of OBUs having a same MAC address is a quantity of times for which each of the plurality of OBUs performs decryption by using a symmetric key of the OBU. As a result, resources of the OBUs are wasted.

Therefore, how to resolve an address conflict among a plurality of OBUs to avoid an OBU resource waste is an urgent technical problem to be resolved.

SUMMARY

This application provides a communication method, a communication apparatus, a communication system, a computer storage medium, and a computer program product that are applied to avoid a decryption resource waste of a device.

According to a first aspect, this application provides a communication method. The communication method includes: A first device receives a first vehicle service indication VSI message, where the first VSI message carries a first media access control MAC address of a second device, a first key of the second device, and first ciphertext information obtained by encrypting first information of the second device by using the first key. The first device receives a second VSI message, where the second VSI message carries a second MAC address of a third device, a second key of the third device, and second ciphertext information obtained by encrypting second information of the third device by using the second key, and the first MAC address is the same as the second MAC address. The first device sends a first action-request message based on the first VSI message and the second VSI message, where the first action-request message carries the first MAC address and third ciphertext information obtained by encrypting third information by using the first key.

It may be understood that the first device may further receive a VSI message sent by another device or VSI messages sent by more devices, and a MAC address carried in the VSI message sent by the one or more devices is the same as the first MAC address.

If the first device sends, for a plurality of VSI messages carrying a same MAC address, a plurality of action-request messages carrying the same MAC address, each of a plurality of sending devices (for example, a second device and a third device) corresponding to the plurality of VSI messages successfully verifies the plurality of action-request messages based on the same MAC address, and further decrypts ciphertext information in the plurality of action-request messages by using a key of the device (decryption of ciphertext information in most action-request messages fails). Therefore, a burden of information processing is heavy. However, in the communication method according to the first aspect, for a plurality of VSI messages carrying a same MAC address, the first device sends only one action-request message (for example, the first action-request message) that carries the same MAC address. In this case, each of the plurality of sending devices (for example, the second device and the third device) corresponding to the plurality of VSI messages only successfully verifies the one action-request message based on the same MAC address, and ciphertext information in the foregoing one action-request message is decrypted by using a key of the device. In this way, a waste of information processing resources can be avoided.

Optionally, in the communication method, the third information may be the same as or different from the first information. For example, the first information may include one or more types of information of a subscription serial number of the second device, information about a vehicle to which the second device belongs, and pass-through information of the second device, and the third information may include a transaction record or the like.

Similarly, the third ciphertext information may be the same as or different from the first ciphertext information. For example, when the first information is the same as the third information, the first ciphertext information may be the same as the third ciphertext information. For another example, when the first information is different from the third information, the first ciphertext information may be different from the third ciphertext information.

In the communication method, the first information may include any encrypted information sent to the first device by the second device; the second information may include any encrypted information sent by a third device system to the first device; and the third information may be any encrypted information sent by the first device to the second device.

With reference to the first aspect, in a first possible implementation, that the first device sends a first action-request message based on the first VSI message and the second VSI message includes: The first device does not send an action-request message that is in response to the second VSI message; and the first device sends the first action-request message based on the first VSI message.

In this implementation, optionally, the method further includes: The first device receives a third VSI message from the third device, where the third VSI message carries a third MAC address of the third device, a third key of the third device, and ciphertext information obtained by encrypting the second information by using the third key, and the third MAC address is different from the second MAC address.

To be specific, after the first device receives the first VSI message sent by the second device and the second VSI message sent by the third device, when the first MAC address of the second device carried in the first VSI message is the same as the second MAC address of the third device carried in the second VSI message, the first device sends only the first action-request message that carries the first MAC address and the ciphertext information obtained through encryption by using the first key of the second device, but does not send an action-request message that carries the same address and the ciphertext information obtained through encryption by using the second key of the third device.

In this implementation, to ensure that the third device can complete service transaction, the third device may resend the third VSI message that carries the third MAC address different from the second MAC address and the ciphertext information obtained by encrypting the second information by using the third key. Because the third MAC address is different from the second MAC address, a conflict with another device whose MAC address is the second MAC address can be avoided. In this way, the first device can normally send the action-request message to the third device based on the third VSI message.

In this implementation, the third MAC address being different from the second MAC address may be understood as the third MAC address being different from the first MAC address.

In this implementation, optionally, the third key and the second key may be the same or different. If the third key is the same as the second key, complexity of the third device can be reduced.

With reference to the first aspect, in a second possible implementation, the method further includes: The first device sends a second action-request message based on the first VSI message and the second VSI message, where the second action-request message carries a third MAC address and fourth ciphertext information obtained by encrypting fourth information by using the second key, and the third MAC address is different from the second MAC address.

To be specific, after the first device receives the first VSI message sent by the second device and the second VSI message sent by the third device, when the first MAC address of the second device carried in the first VSI message is the same as the second MAC address carried in the second VSI message, the first device sends the first action-request message that carries the first MAC address and the ciphertext information obtained through encryption by using the first key of the second device, and sends the second action-request message that carries the third MAC address different from the second MAC address and the ciphertext information obtained through encryption by using the second key of the third device.

In this way, a quantity of times that the second device and the third device separately decrypt the ciphertext information by using the key of the second device and the key of the third device can be reduced. In this way, a resource waste can be avoided, and it can be ensured that the second device and the third device can separately receive a corresponding action-request message to complete a service.

In this implementation, the fourth information may include any encrypted information sent by the first device to the third device.

Optionally, in this implementation, the fourth information may be the same as or different from the second information. For example, the second information may include one or more types of information of a subscription serial number of the third device, information about a vehicle to which the third device belongs, and pass-through information of the third device, and the fourth information may include a transaction record or the like.

Similarly, the fourth ciphertext information may be the same as or different from the second ciphertext information. For example, when the second information is the same as the fourth information, the fourth ciphertext information may be the same as the second ciphertext information. For another example, when the second information is different from the fourth information, the second ciphertext information may be different from the fourth ciphertext information.

With reference to the second possible implementation, in a third possible implementation, the third MAC address is a reserved MAC address.

With reference to the second possible implementation, in a fourth possible implementation, the third MAC address is a MAC address determined based on a preset rule and the second MAC address.

For example, the preset rule may include: adding a preset value to the second MAC address. In other words, the third MAC address may be obtained by adding a preset value to the second MAC address. An example of the preset value is 1.

With reference to the first aspect or any foregoing possible implementation, in a fifth possible implementation, a time at which the first device receives the first VSI message is earlier than a time at which the first device receives the second VSI message; or a quantity of VSI messages received by the first device from the second device within first preset duration is greater than a quantity of VSI messages received by the first device from the third device within the first preset duration; or a priority of the second device is higher than a priority of the third device; or a priority of a service corresponding to the first VSI message is higher than a priority of a service corresponding to the second VSI message; or a priority of a user of the second device is higher than a priority of a user of the third device.

In other words, after receiving a plurality of VSI messages carrying a same MAC address, when the first device needs to determine a device having a key that is used for encryption to obtain the ciphertext information carried in the action-request message carrying the same MAC address, in other words, when the first device determines a device to which the action-request message needs to be sent based on the same MAC address, the first device may refer to a sequence of times at which the first device receives the VSI messages sent by the devices, or a quantity of VSIs sent by the devices to the first device within first preset duration, or priorities of devices sending the VSI messages, or priorities of services corresponding to the VSI messages sent by the devices, or priorities of users of the devices.

The first device sends, to a sending device with a VSI message that first arrives at the first device among the VSI messages with the same MAC address, the action-request message carrying the same MAC address; or the first device sends, based on the same MAC address, the action-request message to a device that sends a large quantity of VSI messages within the first preset duration; or the first device sends, based on the same MAC address, the action-request message to a device with a high priority; or the first device sends, based on the same MAC address, the action-request message to a device used by a user with a high priority; or the first device sends, based on the same MAC address, the action-request message to a device requesting a service of a high priority.

With reference to the first aspect or any foregoing possible implementation, in a sixth possible implementation, an interval between the time at which the first device receives the first VSI message and the time at which the first device receives the second VSI message is less than or equal to second preset duration.

In other words, the first device performs the first aspect or any foregoing possible implementation only when the second device and the third device use a same MAC address in the second preset duration. In this way, the third device does not repeatedly send the VSI message, and therefore, computing resources and transmission resources of the third device are saved.

In the first aspect or any foregoing possible implementation, optionally, a key of each device may be carried as a ciphertext in a VSI message. For example, the second device and/or the third device may encrypt the key of the second device and/or the key of the third device by using the public key of the first device, and then the key is carried in the ciphertext information that is obtained through encryption and that is carried in the VSI message.

According to a second aspect, this application provides a communication method. The communication method includes: A second device sends a first vehicle service indication VSI message to a first device, where the first VSI message carries a first media access control MAC address of the second device, a first key of the second device, and first ciphertext information obtained by encrypting first information of the second device by using the first key. The second device receives an action-request message from the first device, where the action-request message carries the first MAC address and second ciphertext information, and the second ciphertext information cannot be successfully decrypted by using the first key. The second device sends a second VSI message to the first device, where the second VSI message carries a second MAC address of the second device, a second key of the second device, and third ciphertext information obtained by encrypting the first information by using the second key, and the second MAC address is different from the first MAC address.

According to the communication method, for a plurality of VSI messages carrying a same MAC address, the first device may send only one action-request message (namely, a first action-request message) that carries the same MAC address, and does not need to send an action-request message carrying the same MAC address for each of the plurality of VSI messages. Therefore, when each of a plurality of sending devices (including the second device) for the plurality of VSI messages verifies a MAC address in a received action-request message based on a current MAC address of the device, a MAC address in only one action-request message can be verified successfully, and MAC addresses in a plurality of action-request messages cannot be verified successfully, so that each of the plurality of devices only needs to use a key of the device to decrypt ciphertext information in only one action-request message carrying the same MAC address, but does not need to decode, by using the key of the device, ciphertext information in more action-request messages carrying the same MAC address. In this way, a resource waste of the plurality of devices can be avoided.

In addition, in the communication method, when the second device cannot successfully decrypt the ciphertext information in the action-request message by using the first key of the second device, the second device resends the second VSI message to the first device based on the second MAC address different from the first MAC address, so that the first device can send a corresponding action-request message to the second device. In this way, it can be ensured that a service of the second device can be normally implemented.

According to the communication method, the first information may include any ciphertext information sent by the second device to the first device.

With reference to the second aspect, in a first possible implementation, an interval between a time at which the second device sends the second VSI message to the first device and a time at which the second device receives the action-request message is greater than or equal to preset duration, and the second device does not receive, within the preset duration, an action-request message that carries the first MAC address and ciphertext information that can be successfully decrypted by using the first key.

To be specific, when the second device receives an action-request message carrying the MAC address of the second device, but fails to successfully decrypt ciphertext information in the action-request message by using the key of the second device, the second device does not immediately resend a VSI message. Instead, the second device sends a second VSI message only when the second device waits for the first preset duration and does not receive, within the first preset duration, an action-request message that carries the MAC address of the second device and the ciphertext information that can be successfully decrypted by the key of the second device.

In this implementation, the second device does not repeatedly send the VSI message. In this case, a resource waste of the second device can be avoided, and efficiency of receiving a correct action-request message by the second device can be improved. This is because an action-request message with ciphertext information that cannot be successfully decrypted may be a harassment action-request message or a tampered action-request message. The appropriate action-request message sent by the first device to the second device is likely to arrive at the second device after the harassment action message or the tampered action-request message. In this case, the second device only needs to wait for a longer period of time to receive the action-request message, and does not need to resend the VSI message.

With reference to the second aspect or the first possible implementation, in a second possible implementation, the second MAC address is a reserved MAC address.

With reference to the second aspect or the first possible implementation, in a third possible implementation, the second MAC address is determined based on a preset rule and the second MAC address.

For example, the preset rule may include: adding a preset value to the first MAC address. In other words, the second MAC address may be obtained by adding a preset value to the first MAC address. An example of the preset value is 1.

With reference to the second aspect or the first possible implementation, in a fourth possible implementation, the second MAC address may be randomly generated.

In the second aspect or any foregoing possible implementation, optionally, a key of each device may be carried as a ciphertext in a VSI message. For example, the second device and/or the first device may encrypt the key of the second device and/or the key of the first device by using a public key of the first device, and then uses the VSI message to carry the ciphertext information obtained through encryption, so as to carry the key.

According to a third aspect, this application provides a communication method. The communication method includes: A second device sends a first vehicle service indication VSI message to a first device, where the first VSI message carries a first media access control MAC address of the second device, a first key of the second device, and first ciphertext information obtained by encrypting first information of the second device by using the first key. The second device receives a first action-request message from the first device, where the first action-request message carries the first MAC address and second ciphertext information. The second device receives a second action-request message from the first device, where the second action-request message carries a second MAC address and third ciphertext information, and the second MAC address is different from the first MAC address. The second device determines that the second ciphertext information cannot be successfully decrypted by using the first key. The second device determines that the second MAC address meets a preset condition. The second device decrypts the third ciphertext information by using the first key.

To be specific, after the second device sends, to the first device, the VSI message that carries the first MAC address of the second device and the ciphertext information obtained through encryption by using the first key of the second device, when the first action-request message carrying the first MAC address and the ciphertext information that cannot be successfully decrypted by using the first key is received, the second device may decrypt, by using the first key, the ciphertext information in the second action-request message carrying the second MAC address.

According to the communication method, for a plurality of VSI messages carrying a same MAC address, the first device may send only one action-request message (namely, the first action-request message) that carries the same MAC address, and does not need to send an action-request message carrying the same MAC address for each of the plurality of VSI messages. Therefore, when each of a plurality of sending devices (including the second device) for the plurality of VSI messages verifies a MAC address in the received action-request message based on a current MAC address of the device, the MAC address in only one action-request message can be verified successfully, and the MAC addresses in the plurality of action-request messages cannot be verified. Each of the plurality of devices only needs to use the key of the device to decrypt the ciphertext information in only one action-request message carrying the same MAC address, but does not need to decode, by using the key of the device, ciphertext information in more action-request messages carrying the same MAC address. In this way, a resource waste of the plurality of devices can be avoided.

In addition, according to the communication method, the first device may send the action-request message to the second device based on the second MAC address different from the conflicting first MAC address, so that the second device can continue to perform a subsequent process with low resource overheads.

With reference to the third aspect, in a first possible implementation, the preset condition includes: The second MAC address is a reserved MAC address.

With reference to the third aspect, in a second possible implementation, the preset condition includes: The second MAC address is determined based on a preset rule and the first MAC address.

For example, the preset rule may include: adding a preset value to the first MAC address. In other words, the second MAC address may be obtained by adding a preset value to the first MAC address. An example of the preset value is 1.

With reference to the third aspect or any foregoing possible implementation, in a third possible implementation, an interval between a time at which the second device decrypts the third ciphertext information by using the first key and a time at which the second device receives the first action-request message is greater than or equal to first preset duration, and the second device does not receive, within the first preset duration, an action-request message that carries the same first MAC address and the ciphertext information that can be successfully decrypted by using the first key.

In this implementation, a resource waste of the second device can be avoided. This is because the first action-request message may be a harassment action-request message or a tampered action-request message. The action-request message sent by the first device to the second device is likely to arrive at the second device after the first action message. In this case, the second device only needs to wait for a longer period of time to receive the action-request message, and does not need to receive the action-request message whose MAC address is the second MAC address. Therefore, the second MAC address does not need to be determined, and resources are saved.

With reference to the third aspect or any foregoing possible implementation, in a fourth possible implementation, the method further includes: The second device determines that the third ciphertext information cannot be successfully decrypted by using the first key. The second device sends a second VSI message to the first device, where the second VSI message carries a third MAC address of the second device, a second key of the second device, and fourth ciphertext information obtained by encrypting the first information by using the second key.

To be specific, when the second device cannot successfully decrypt, by using the first key, the first action-request message sent based on the first MAC address, and cannot successfully decrypt, by using the first key, the second action-request message sent based on the agreed second MAC address, the second device may resend the VSI message to the first device based on the agreed third MAC address, to ensure appropriate and normal running of a subsequent process.

In this implementation, optionally, the first key and the second key may be the same or different. When the first key and the second key are the same, because the second device does not regenerate a new key, complexity of the second device can be reduced and computing resources of the third device can be saved.

In this implementation, optionally, a manner of determining the third MAC address may be the same as or different from a manner of determining the second MAC address.

For example, a difference between the manner of determining the third MAC address is different from the manner of determining the second MAC address is that the third MAC address may be randomly generated.

With reference to the fourth possible implementation, in a fifth possible implementation, an interval between a time at which the second device sends the second VSI message and a time at which the second device receives the second action-request message is greater than or equal to second preset duration, and the second device does not receive, within the second preset duration, an action-request message that carries the second MAC address and the ciphertext information that can be successfully decrypted by using the first key.

In this implementation, the second device does not repeatedly send the VSI message. In this case, a resource waste of the second device can be avoided, and efficiency of receiving a correct action-request message by the second device can be improved. This is because the second action-request message may be a harassment action-request message or a tampered action-request message. The correct action-request message sent by the first device to the second device is likely to arrive at the second device after the second action-request message. In this case, the second device only needs to wait for a longer period of time to receive the action-request message, and does not need to resend the VSI message.

In the third aspect or any foregoing possible implementation, optionally, a key of each device may be carried as a ciphertext in a VSI message. For example, the second device and/or the first device may encrypt the key of the second device and/or the key of the first device by using a public key of the first device, and then uses the VSI message to carry the ciphertext information obtained through encryption, so as to carry the key.

According to a fourth aspect, this application provides a communication apparatus. The communication apparatus is applied to a first device, and the communication apparatus may be, for example, the first device, or a hardware module, a software module, or a chip in the first device. The communication apparatus includes one or more function modules configured to implement the communication method in any one of the first aspect or the possible implementations of the first aspect.

In an example, the communication apparatus includes a receiving module and a sending module.

The receiving module is configured to receive a first vehicle service indication VSI message from a second device, where the first VSI message carries a first media access control MAC address of the second device, a first key of the second device, and first ciphertext information obtained by encrypting first information of the second device by using the first key.

The receiving module is further configured to receive a second VSI message from a third device, where the second VSI message carries a second MAC address of the third device, a second key of the third device, and second ciphertext information obtained by encrypting second information of the third device by using the second key, and the first MAC address is the same as the second MAC address.

The sending module is configured to send a first action-request message based on the first VSI message and the second VSI message, where the first action-request message carries the first MAC address and third ciphertext information obtained by encrypting third information by using the first key.

With reference to the fourth aspect, in a first possible implementation, the sending module is specifically configured to refrain from sending an action-request message that is in response to the second VSI message; and send the first action-request message based on the first VSI message.

With reference to the fourth aspect, in a second possible implementation, the sending module is further configured to send a second action-request message based on the first VSI message and the second VSI message, where the second action-request message carries a third MAC address and fourth ciphertext information obtained by encrypting fourth information by using the second key, and the third MAC address is different from the second MAC address.

With reference to the second possible implementation, in a third possible implementation, the third MAC address is a reserved MAC address.

With reference to the second possible implementation, in a fourth possible implementation, the third MAC address is determined based on a preset rule and the second MAC address.

With reference to the fourth aspect or any foregoing possible implementation, in a fifth possible implementation, a time at which the first device receives the first VSI message is earlier than a time at which the first device receives the second VSI message; or a quantity of VSI messages received by the first device from the second device within first preset duration is greater than a quantity of VSI messages received by the first device from the third device within the first preset duration; or a priority of the second device is higher than a priority of the third device; or a priority of a service corresponding to the first VSI message is higher than a priority of a service corresponding to the second VSI message; or a priority of a user of the second device is higher than a priority of a user of the third device.

With reference to the fourth aspect or any foregoing possible implementation, in a sixth possible implementation, an interval between the time at which the first device receives the first VSI message and the time at which the first device receives the second VSI message is less than or equal to second preset duration.

According to a fifth aspect, this application provides a communication apparatus. The communication apparatus is applied to a second device, and the communication apparatus may be, for example, the second device, or a hardware module, a software module, or a chip in the second device. The communication apparatus includes one or more function modules configured to implement the communication method in any one of the second aspect or the possible implementations of the second aspect.

In an example, the communication apparatus includes a sending module and a receiving module.

The sending module is configured to send a first vehicle service indication VSI message to a first device, where the first VSI message carries a first media access control MAC address of the second device, a first key of the second device, and first ciphertext information obtained by encrypting first information of the second device by using the first key.

The receiving module is configured to receive an action-request message from the first device, where the action-request message carries the first MAC address and second ciphertext information, and the second ciphertext information cannot be successfully decrypted by using the first key.

The sending module is configured to send a second VSI message to the first device, where the second VSI message carries a second MAC address of the second device, a second key of the second device, and third ciphertext information obtained by encrypting the first information by using the second key, and the second MAC address is different from the first MAC address.

With reference to the fifth aspect, in a first possible implementation, an interval between a time at which the second device sends the second VSI message to the first device and a time at which the second device receives the action-request message is greater than or equal to preset duration, and the second device does not receive, within the preset duration, an action-request message that carries the first MAC address and ciphertext information that can be successfully decrypted by using the first key.

With reference to the fifth aspect or the first possible implementation, in a second possible implementation, the second MAC address is a reserved MAC address.

With reference to the fifth aspect or the first possible implementation, in a second possible implementation, the second MAC address is determined based on a preset rule and the first MAC address.

According to a sixth aspect, this application provides a communication apparatus. The communication apparatus is applied to a second device, and the communication apparatus may be, for example, the second device, or a hardware module, a software module, or a chip in the second device. The communication apparatus includes one or more function modules configured to implement the communication method in any one of the third aspect or the possible implementations of the third aspect.

In an example, the communication apparatus includes a sending module, a receiving module, and a processing module.

The sending module is configured to send a first vehicle service indication VSI message to a first device, where the first VSI message carries a first media access control MAC address of the second device, a first key of the second device, and first ciphertext information obtained by encrypting first information of the second device by using the first key.

The receiving module is configured to receive a first action-request message from the first device, where the first action-request message carries the first MAC address and second ciphertext information.

The receiving module is further configured to receive a second action-request message from the first device, where the second action-request message carries a second MAC address and third ciphertext information, and the second MAC address is different from the first MAC address.

The processing module is configured to: determine that the second ciphertext information cannot be successfully decrypted by using the first key; determine that the second MAC address meets a preset condition; and decrypt the third ciphertext information by using the first key.

With reference to the sixth aspect, in a first possible implementation, the preset condition includes: The second MAC address is a reserved MAC address.

With reference to the sixth aspect, in a second possible implementation, the preset condition includes: The second MAC address is determined based on a preset rule and the first MAC address.

With reference to the sixth aspect or any foregoing possible implementation, in a third possible implementation, an interval between a time at which the second device decrypts the third ciphertext information by using the first key and a time at which the second device receives the first action-request message is greater than or equal to first preset duration, and the second device does not receive, within the first preset duration, an action-request message that carries the first MAC address and ciphertext information that can be successfully decrypted by using the first key.

With reference to the sixth aspect or any foregoing possible implementation, in a fourth possible implementation, the processing module is further configured to determine that the third ciphertext information cannot be successfully decrypted by using the first key.

Correspondingly, the sending module is further configured to send a second VSI message to the first device, where the second VSI message carries a third MAC address of the second device, a second key of the second device, and fourth ciphertext information obtained by encrypting the second information by using the second key.

With reference to the fourth possible implementation, in a fifth possible implementation, an interval between a time at which the second device sends the second VSI message and a time at which the second device receives the second action-request message is greater than or equal to second preset duration, and the second device does not receive, within the second preset duration, an action-request message that carries the second MAC address and the ciphertext information that can be successfully decrypted by using the first key.

In any one of the foregoing aspects or possible implementations, in an example, the first device, the second device, or the third device may be an RSU, a chip in an RSU, or a roadside device including an RSU, or may be an OBU, a chip in an OBU, or a vehicle that includes an OBU, or may be another device or chip that supports vehicle-to-everything (V2X) communication.

According to a seventh aspect, this application provides a communication apparatus. The communication apparatus includes a processor coupled to a memory. The memory is configured to store program instructions. The processor is configured to invoke the program instructions in the memory to implement the communication method in any one of the first aspect or the possible implementations of the first aspect.

Optionally, the communication apparatus may further include the memory.

Optionally, the communication apparatus may further include an interface circuit, and the interface circuit may include a transceiver or an input/output interface.

According to an eighth aspect, this application provides a communication apparatus. The communication apparatus includes a processor coupled to a memory. The memory is configured to store program instructions. The processor is configured to invoke the program instructions in the memory to implement the communication method in any one of the second aspect or the possible implementations of the second aspect.

Optionally, the communication apparatus may further include the memory.

Optionally, the communication apparatus may further include an interface circuit, and the interface circuit may include a transceiver or an input/output interface.

According to a ninth aspect, this application provides a communication apparatus. The communication apparatus includes a processor coupled to a memory. The memory is configured to store program instructions. The processor is configured to invoke the program instructions in the memory to implement the communication method in any one of the third aspect or the possible implementations of the third aspect.

Optionally, the communication apparatus may further include the memory.

Optionally, the communication apparatus may further include an interface circuit, and the interface circuit may include a transceiver or an input/output interface.

According to a tenth aspect, this application provides a computer-readable storage medium. The computer-readable storage medium stores program instructions. When the program instructions are executed by a processor, the communication method in any one of the first aspect or the possible implementations of the first aspect is implemented.

According to an eleventh aspect, this application provides a computer-readable storage medium. The computer-readable storage medium stores program instructions. When the program instructions are executed by a processor, instructions in the communication method in any one of the second aspect or the possible implementations of the second aspect are implemented.

According to a twelfth aspect, this application provides a computer-readable storage medium. The computer-readable storage medium stores program instructions. When the program instructions are executed by a processor, instructions in the communication method in any one of the third aspect or the possible implementations of the third aspect are implemented.

According to a thirteenth aspect, this application provides a computer program product including instructions. The computer program product includes program instructions. When the program instructions are run by a processor, the communication method in any one of the first aspect or the possible implementations of the first aspect is implemented.

According to a fourteenth aspect, this application provides a computer program product including instructions. The computer program product includes program instructions. When the program instructions are run on a processor, the communication method in any one of the second aspect or the possible implementations of the second aspect is implemented.

According to a fifteenth aspect, this application provides a computer program product including instructions. The computer program product includes program instructions. When the program instructions are run by a processor, the communication method in any one of the third aspect or the possible implementations of the third aspect is implemented.

According to a sixteenth aspect, this application provides a vehicle. The vehicle includes the communication apparatus in any one of the fifth aspect, the sixth aspect, the eighth aspect, or the ninth aspect, or the implementations thereof.

DESCRIPTION OF EMBODIMENTS

The following describes technical solutions in embodiments of this application with reference to the accompanying drawings in embodiments of this application.

To clearly describe the technical solutions in embodiments of this application, words such as “first” and “second” are used in embodiments of this application to distinguish between same items or similar items that have basically a same function or purpose. For example, first information and second information are merely used to distinguish between different information, and do not limit sequences of the first information and the second information. A person skilled in the art may understand that the terms such as “first” and “second” do not limit a quantity and an execution sequence, and the terms such as “first” and “second” do not indicate a definite difference.

In embodiments of this application, “a plurality of” refers to two or more than two. The term “and/or” describes an association relationship between associated objects and represents that three relationships may exist. For example, A and/or B may indicate the following cases: A exists alone, both A and B exist, and B exists alone, where A and B may be singular or plural. The character “/” usually indicates an “or” relationship between associated objects. “At least one of the following items (pieces)” or a similar expression thereof indicates any combination of these items, including a single item (piece) or any combination of a plurality of items (pieces). For example, at least one of a, b, or c may represent a, b, c, a and b, a and c, b and c, or a, b, and c, where a, b, and c each may be singular or plural.

For ease of understanding methods provided in embodiments of this application, the following describes application scenarios of the methods provided in embodiments of this application. It may be understood that application scenarios described in embodiments of this application are intended to describe the technical solutions in embodiments of this application more clearly, and do not constitute a limitation on the technical solutions provided in embodiments of this application.

Figure 1:
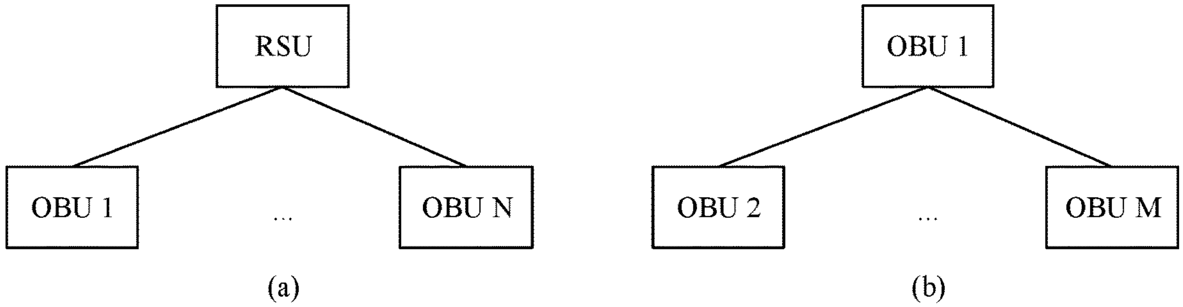
FIG. 1 is an example diagram of an architecture of a communication system to which an embodiment of this application is applicable.

FIG. 1 is a schematic diagram of example application scenarios to which the communication methods according to embodiments of this application are applied. It may be understood that the application scenarios shown in FIG. 1 are merely examples, and the communication methods in embodiments of this application is applicable to any V2X communication system.

As shown in (a) in FIG. 1, the application scenario includes an RSU and N OBUs, where the N OBUs are respectively denoted as an OBU 1, an OBU 2, and an OBU N, and N is a positive integer.

The RSU is usually installed on a roadside and communicates with an OBU using a dedicated short-range communication (DSRC) technology.

The OBU is usually installed on a vehicle. When the vehicle passes by the RSU, the OBU communicates with the RSU through microwave. In this way, during travelling of the vehicle, a function of vehicle identity identification and/or electronic payment can be implemented without stopping the vehicle, in other words, a vehicle channel that does not require payment with a card or even stopping of the vehicle can be implemented.

For example, in a toll collection scenario on a highway, the RSU may be a toll station deployed on a roadside, and the OBU may be a device deployed on a vehicle. When the vehicle passes by the RSU on the way, the communication methods in embodiments of this application are performed, and a function of vehicle toll collection without stopping the vehicle can be implemented.

For another example, in a toll collection scenario in a parking lot, the RSU may be a toll station deployed in the parking lot, and the OBU is deployed on a vehicle. When the vehicle stops in the parking lot, the communication methods in embodiments of this application are performed, to implement a function of vehicle toll collection without stopping the vehicle.

For another example, in a city, the RSU may be a toll station deployed on a side of a specific road, and the OBU is deployed on a vehicle. When the vehicle drives through the specific road, the communication methods in embodiments of this application are performed, and a congestion fee for the vehicle driving through the specific road can be charged without stopping the vehicle.

As shown in (b) in FIG. 1, the application scenario includes M OBUs, and the M OBUs are respectively denoted as an OBU 1, an OBU 2, and an OBU M, where M is an integer greater than 1.

The OBU 1 and another OBU may communicate with each other by using the DSRC technology. The OBU 1 may be installed on a vehicle, and the vehicle may move to any place where toll collection or OBU recognition is needed, to serve as a toll station.

Other OBUs passing by the OBU 1 communicate with the OBU 1 through microwave. In this way, during traveling of vehicles configured with these OBUs, a function of vehicle identity identification and/or electronic payment can be implemented without stopping the vehicles, in other words, a vehicle channel that does not require payment with a card or even stopping of the vehicles can be implemented.

For example, in a toll collection scenario on a highway, the OBU 1 may be deployed on a vehicle and used as a mobile toll collection station. When another vehicle configured with an OBU passes by the OBU 1, the communication methods in embodiments of this application is performed, so that the other vehicle can collect a traffic fee of the vehicle without stopping the vehicle.

For another example, in a scenario of a parking area that requires toll collection, the OBU 1 may be deployed on a vehicle used as a mobile toll collection station. When another vehicle configured with an OBU passes by the OBU 1, the communication methods in embodiments of this application are performed, so that a function of collecting a parking fee of the vehicle without stopping the vehicle can be implemented.

For another example, in a city, the OBU 1 may be deployed on a vehicle used as a mobile toll collection station. When another vehicle configured with an OBU passes by the OBU 1, the communication methods in embodiments of this application are performed, so that a function of collecting a congestion fee of the vehicle driving through a specific road is collected without stopping the vehicle.

In (a) in FIG. 1 and (b) in FIG. 1, an RSU or an OBU used as a toll station may be collectively referred to as a toll charging device, and an OBU interacting with the toll station may be referred to as a payment device.

An example in which a charging device is an RSU and a payment device is an OBU is used below to describe a process of implementing a payment service between the charging device and the payment device.

Figure 2:
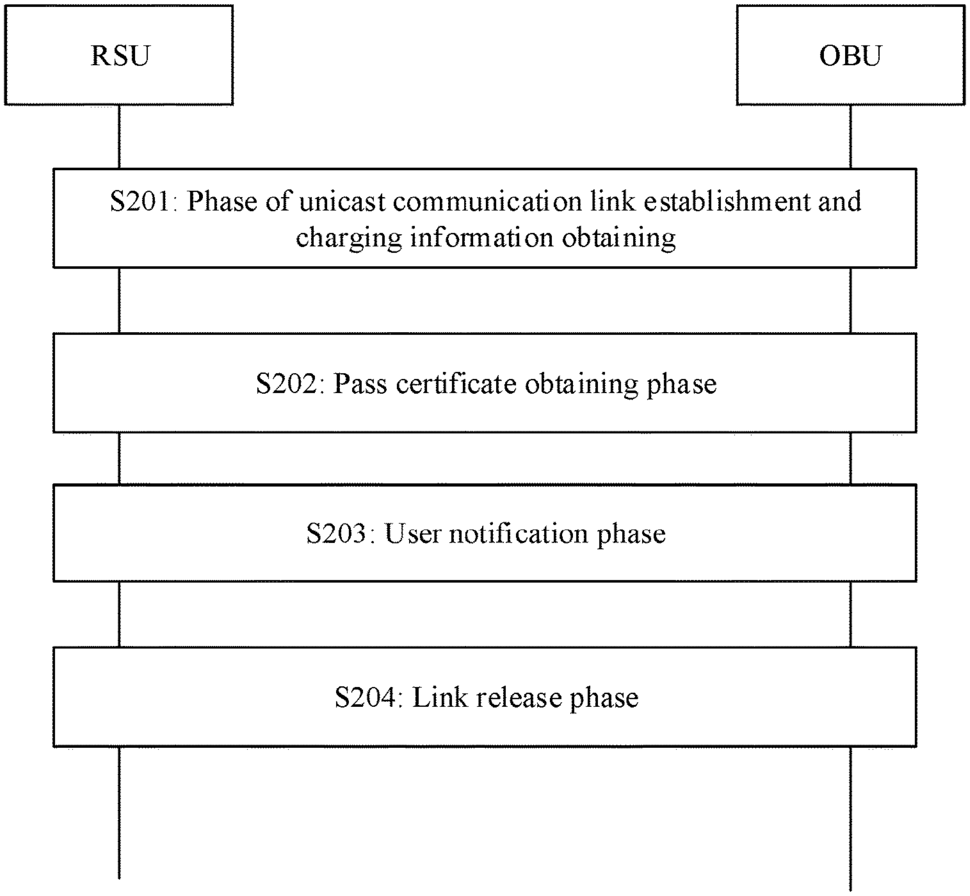
FIG. 2 is a schematic diagram of main phases of near-field payment based on LTE-V2X.

FIG. 2 is a schematic diagram of main phases of near-field payment based on a Long-Term Evolution (LTE)-V2X system. As shown in FIG. 2, the payment service between the RSU and the OBU may usually include four phases. The four phases are as follows: a phase 1, which is a phase of unicast communication link establishment and charging information obtaining; a phase 2, which is a pass certificate obtaining phase; a phase 3, which is a user notification phase; and a phase 4, which is a link release phase.

In the phase of unicast communication link establishment and charging information obtaining, the RSU and the OBU may establish a unicast connection, determine a charging service type, exchange transaction information, exchange station information, and the like.

In the pass certificate obtaining phase, the RSU and the OBU may exchange a charging transaction certificate.

In the user notification phase, the RSU may send a transaction result to the OBU, and the OBU may output notification information indicating that the user is to get out of the site.

In a link release phase, the link between the RSU and the OBU may be broken, to release a resource.

It may be understood that, in this embodiment of this application, a process of implementing the payment service between the RSU and the OBU may include fewer, more, or alternative phases.

Figure 3:
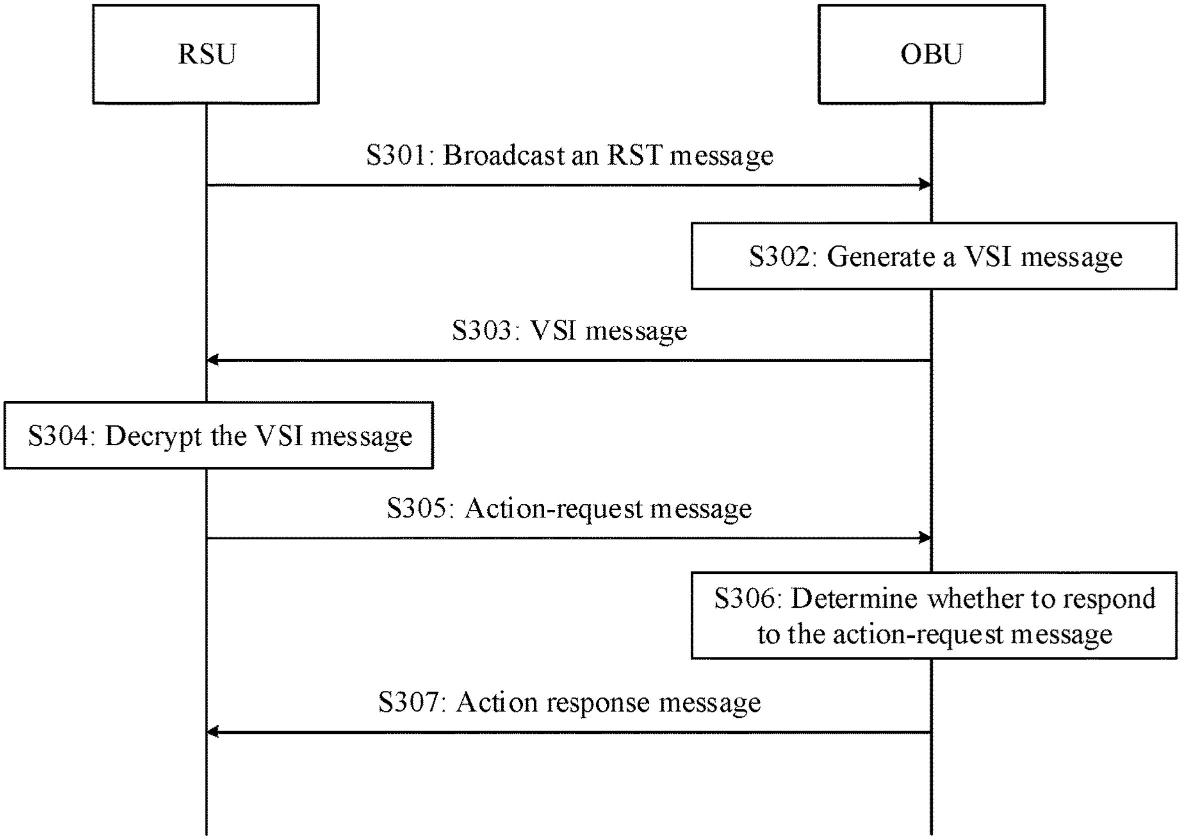
FIG. 3 is an example flowchart of an existing communication method.

As shown in FIG. 3, the phase of unicast communication link establishment and charging information obtaining may include steps such as S301 to S307.

S301: An RSU broadcasts an RST message.

In an example, the RSU may include announcement information of a near-field payment service, and the announcement information may include one or more types of information such as payment node information, a charging type, and charging information.

In an example, the payment node information may indicate related information of the RSU used as a charging station. For example, the payment node information may indicate information such as a communication mode and/or a payment mode supported by the RSU.

In an example, the charging type may include one or more of the following charging types: highway charging, parking charging, or congestion fee charging.

In an example, the charging information may indicate a charging policy. For example, for highway charging, a charging policy specifies fees charged based on distance. For another example, for parking charging, a charging policy specifies fees charged based on duration.

Optionally, the RST message may further include an application identifier (AID) used to implement the near-field payment service.

Optionally, the RST message may be signed by using a private key of a certificate of the RSU.

Optionally, in addition to sending the RST message, the RSU may further send the certificate of the RSU, where the certificate includes a public key.

S302: An OBU receiving the RST message generates a VSI message, where the VSI message carries a MAC address of the OBU, a key of the OBU, and ciphertext information obtained by encrypting to-be-encrypted information by using the key of the OBU.

In an example, after receiving the RST message, the OBU can determine, based on content of the RST message, for example, based on information such as an AID, whether to initiate a response message of the RST message to the RSU.

That an OBU generates a VSI message may include: The OBU generates the MAC address and the key, encrypts the to-be-encrypted information of the OBU by using the key to obtain the ciphertext information, and generates the VSI message carrying the MAC address and the ciphertext information.

The to-be-encrypted information of the OBU may include any information that the OBU expects to transmit to a charging device as a ciphertext. For example, the to-be-encrypted information of the OBU may include one or more types of information such as a subscription serial number of the OBU, information about a vehicle to which the OBU belongs, and pass-through information.

The information about the vehicle to which the OBU belongs may include information of a vehicle type. For example, the vehicle is a car or a truck with fewer than seven seats.

In a highway charging scenario, for example, the pass-through information of the vehicle to which the OBU belongs may include an entrance for the vehicle to enter a highway and/or an exit for the vehicle to leave the highway.

In a parking charging scenario, for example, the pass-through information of the vehicle to which the OBU belongs may include a time when the vehicle enters a parking area and/or a time when the vehicle leaves the parking area.

Optionally, the to-be-encrypted information of the OBU may be carried in an application layer message. In this case, encryption of the to-be-encrypted information by the OBU by using the key may be understood as encryption of the application layer message by the OBU by using the key.

Optionally, to improve transmission security of the key of the OBU, the OBU may encrypt the key of the OBU. For example, when the RST message includes the certificate of the RSU, the OBU may encrypt the key of the OBU by using the public key in the certificate of the RSU. In this implementation, that the VSI message carries a key of the OBU may include: The VSI message carries an encrypted key of the OBU.

S303: The OBU sends the VSI message. Correspondingly, the RSU receives the VSI message.

S304: The RSU decrypts the ciphertext information in the VSI message by using the OBU key in the VSI message, to obtain plaintext information.

Optionally, the OBU key in the VSI message may be carried in ciphertext information obtained through encryption by using the public key of the certificate of the RSU. In this case, the RSU may first decrypt, by using a key of the certificate of the RSU, the key ciphertext to obtain the OBU key, and then decrypt the ciphertext information in the VSI message by using the OBU key.

S305: The RSU sends an action-request message to the OBU, where the action-request message carries the MAC address of the OBU, the key of the OBU, and the ciphertext information obtained by encrypting the to-be-encrypted information of the RSU by using the key of the OBU.

The to-be-encrypted information of the RSU may include any information that the RSU expects to transmit to the OBU as a ciphertext. For example, the to-be-encrypted information of the RSU may include one or more types of information such as a transaction record and pass-through information.

Optionally, the to-be-encrypted information of the RSU may be carried in an application layer message. In this case, encryption of the to-be-encrypted information by the RSU may be understood as encryption of the application layer message with the key by the RSU.

Optionally, the RSU may further sign information such as the MAC address and the ciphertext information of the OBU by using a private key of the RSU, to obtain signature information. In this case, the action-request message further carries the signature information.

S306: The OBU receiving the action-request message determines whether to send an action response (Action response) message in response to the action-request message. In addition, if the OBU determines that the action response message should be sent in response to the action-request message, the OBU performs S307; otherwise, the action-request message is ignored.

In an example, that the OBU determines whether to send an action response message in response to the action-request message includes: The OBU verifies a MAC address in the action-request message; when the MAC address verification succeeds, the OBU decrypts the ciphertext information by using the key of the OBU; and if decryption succeeds, the OBU sends the action response message in response to the action-request message. When MAC address verification and the decryption fail, the OBU may ignore the action-request message.

That the OBU verifies a MAC address in the action-request message includes: The OBU determines whether the MAC address carried in the action-request message is the same as the MAC address of the OBU; and if the MAC address carried in the action-request message is the same as the MAC address of the OBU, the OBU determines that MAC address verification succeeds; otherwise, the OBU determines that the MAC address verification fails.

When the OBU decrypts the ciphertext information by using the key of the OBU, if information obtained through decryption is garbled characters or data that cannot be identified by the OBU, it may be determined that decryption fails; or if the information obtained through decryption is information that can be identified by the OBU, it may be determined that decryption succeeds.

Optionally, if the action-request message carries the signature information, before performing MAC address verification, the OBU may perform signature verification on the action-request message by using the public key of the RSU. If signature verification succeeds, verification is performed on the MAC address carried in the action-request message. If signature verification fails, the action-request message is discarded.

S307: The OBU sends the action response message.

In an example, the action response message carries the MAC address of the OBU and the ciphertext information obtained by encrypting the to-be-encrypted information by using the key of the OBU. The to-be-encrypted information herein may include information such as a transaction certificate or a payment account.

It may be understood that fewer, more, or other alternative steps may be further included between the RSU and the OBU.

When the RSU and the OBU interact with each other according to a procedure shown in FIG. 3, the following situation exists: A plurality of OBUs send VSI messages to the RSU in a same time period, and MAC addresses of the plurality of OBUs are the same, in other words, the MAC addresses of the plurality of OBUs conflict. This causes a problem that each of the plurality of OBUs having the same MAC addresses can successfully verify MAC addresses in a plurality of action-request messages, to decrypt ciphertext information in the plurality of action-request messages by using a key of the OBU. However, actually, each OBU can successfully decrypt ciphertext information in only one action-request message to obtain corresponding information. In the interaction mode, a resource for an OBU to decrypt ciphertext information with a key of the OBU is wasted.

Figure 4:
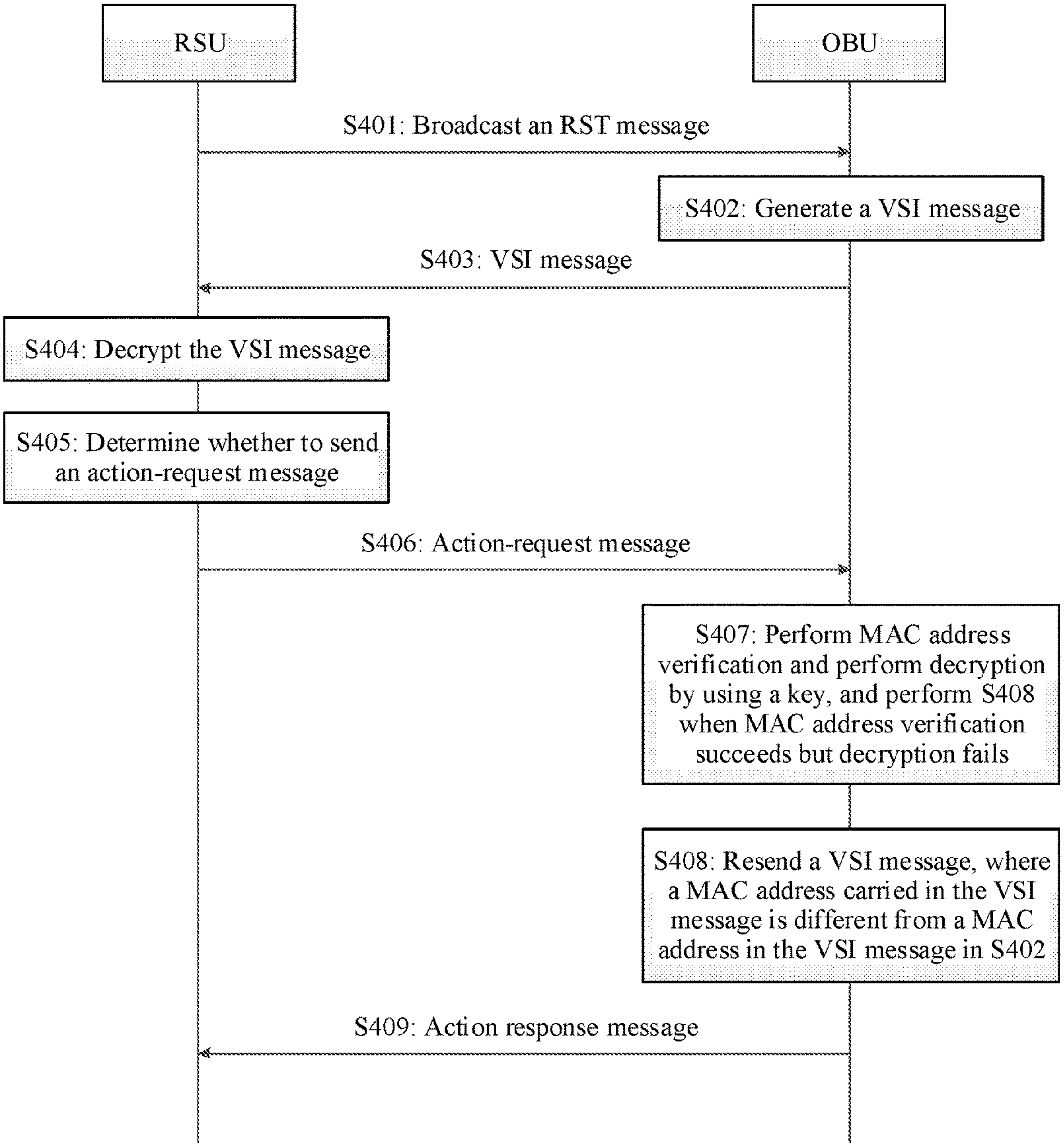
FIG. 4 is an example flowchart of a communication method according to a first embodiment of this application.

For the foregoing problem, an embodiment of this application provides a new communication method. The following describes a communication method provided in an embodiment of this application by using the example in which an OBU is a payment device and an RSU is a charging device. FIG. 4 is a schematic flowchart of a communication method according to an embodiment of this application.

S401: An RSU broadcasts an RST message.

For this step, refer to S301. Details are not described herein again.

S402: An OBU receiving the RST message generates a VSI message, where the VSI message carries a MAC address of the OBU, a key of the OBU, and ciphertext information obtained by encrypting to-be-encrypted information by using the key of the OBU.

For this step, refer to S302. Details are not described herein again.

S403: The OBU sends the VSI message. Correspondingly, the RSU receives the VSI message.

S404: The RSU decrypts the ciphertext information in the VSI message by using the key in the VSI message. For this step, refer to S304. Details are not described herein again.

S405: The RSU determines whether the MAC address in the VSI message conflicts with a MAC address in another VSI message, and determines, based on a determining result, whether to send a corresponding action-request message in response to the VSI message.

In an example in which the RSU determines whether the MAC address in the VSI message conflicts with a MAC address in another VSI message, the RSU determines whether the MAC address in the VSI message is the same as the MAC address in the another VSI message, and if the MAC address in the VSI message is the same as the MAC address in the another VSI message, the RSU determines whether the MAC address in the VSI message conflicts with the MAC address in another VSI message; otherwise, the RSU determines whether the MAC address in the VSI message does not conflict with the MAC address in the another VSI message.

The sending a corresponding action-request message in response to the VSI message includes: sending action information carrying the MAC address in the VSI message and the ciphertext information obtained by encrypting the to-be-encrypted information of the RSU by using the key in the VSI message.

In an example, after receiving the VSI message, the RSU obtains the MAC address in the VSI message, and determines whether the VSI message carrying the MAC address is received within preset duration before the VSI message is received. If the RSU receives, within the preset duration before the VSI message is received, the VSI message carrying the MAC address, the RSU determines not to respond to the VSI message, that is, not to send the action-request message corresponding to the VSI message. If the RSU does not receive, within the preset duration before the VSI message is received, the VSI message carrying the MAC address, the RSU determines to respond to the VSI message, that is, to send the action-request message corresponding to the VSI message.

In another example, the RSU receives a plurality of VSI messages within the preset duration, and responds to an appropriate VSI message selected from the plurality of VSI messages received within the preset duration. The following describes several implementations in which the RSU selects an appropriate VSI message from a plurality of VSI messages.

In a first implementation, the RSU may determine, based on a sequence of receiving times of the plurality of VSI messages, which VSI message is the appropriate VSI message. For example, the RSU may select a VSI message received early as the appropriate VSI message.

In a second implementation, the RSU may select the appropriate VSI message based on a quantity of the VSI messages that are sent by the plurality of OBUs corresponding to the plurality of VSI messages within same preset duration. For example, the RSU may select a VSI message of an OBU that sends more VSI messages within same preset duration as the appropriate VSI message.

In a third implementation, the RSU may select the appropriate VSI message based on an OBU priority. For example, the RSU may select a VSI message sent by an OBU of a higher priority as the appropriate VSI message.

In a fourth implementation, the RSU may select the appropriate VSI message based on a service priority. For example, the RSU may select a VSI message of a higher service priority as the appropriate VSI message.

In a fifth implementation, the RSU may select the appropriate VSI message based on a user priority. For example, the RSU may select a VSI message sent by an OBU of a higher user priority as the appropriate VSI message.

S406: The RSU sends an action-request message, where the action-request message carries the MAC address in the corresponding VSI message and the ciphertext information that is obtained through encrypting the to-be-encrypted information of the RSU by using the key in the corresponding VSI message. Correspondingly, the OBU receives the action-request message.

For this step, refer to S305. Details are not described herein again.

S407: The OBU performs S408 when verification of the MAC address in the action-request message succeeds and decryption, by using the key of the OBU, of the ciphertext information in the action-request message fails.

In an example, when verification of the MAC address in the OBU action-request message succeeds and decryption, by using the key of the OBU, of the ciphertext information in the action-request message fails, the OBU may wait for the preset duration. The OBU performs S408 only when the OBU does not receive, within the preset duration, an action-request message with the MAC address that can be verified successfully and the ciphertext information that can be successfully decrypted by using the key of the OBU. This is because a currently received action-request message may include a tampered MAC address, and the action-request message corresponding to the OBU may subsequently arrive at the OBU. In this implementation, reliability of successfully receiving a corresponding action-request message by the OBU can be improved, and resources are not wasted.

Optionally, the OBU performs S409 when verification of the MAC address in the action-request message succeeds and decryption, by using the key of the OBU, of the ciphertext information in the action-request message succeeds.

Optionally, when verification of the MAC address in the action-request message fails, the OBU performs S408.

In an example, when verification of the MAC address in the OBU action-request message fails, the OBU may wait for the preset duration. The OBU performs S408 only when the OBU does not receive, within the preset duration, an action-request message with the MAC address that can be verified successfully and the ciphertext information that can be successfully decrypted by using the key of the OBU. This is because a currently received action-request message may include a tampered MAC address, and the action-request message corresponding to the OBU may subsequently arrive at the OBU. In this implementation, reliability of successfully receiving a corresponding action-request message by the OBU can be improved, and resources are not wasted.

Optionally, when verification performed by the OBU on signature information of the action-request message by using a public key of a certificate of the RSU fails, the OBU performs S408.

In an example, when signature information of the OBU action-request message fails, the OBU may wait for the preset duration. The OBU performs S408 only when the OBU does not receive, within the preset duration, an action-request message with the MAC address that can be verified successfully and the ciphertext information that can be successfully decrypted by using the key of the OBU. This is because a currently received action-request message may include a tampered MAC address, and the action-request message corresponding to the OBU may subsequently arrive at the OBU. In this implementation, reliability of successfully receiving a corresponding action-request message by the OBU can be improved, and resources are not wasted.

S408: The OBU resends a VSI message, where a MAC address carried in the resent VSI message is different from the MAC address in the VSI message sent earlier.

This step may be performed in S402. A difference is that the new MAC address carried in the VSI message in S408 is different from the original MAC address carried in the VSI message in S402.

The new MAC address may be a reserved MAC address, or may be a MAC address determined by the OBU based on the original MAC address and according to a preset rule.

In an example, the OBU may add a preset value to the original MAC address, to obtain a new MAC address. For example, the preset value may be 1.

Optionally, a key used by the OBU for encryption in this step may be the same as or different from the key used for encryption in S402. If the keys are the same, complexity of the OBU can be reduced. If the keys are different, security can be improved.

S409: The OBU sends an action response message based on the action-request message. For this step, refer to S307. Details are not described herein again.

Figure 5:
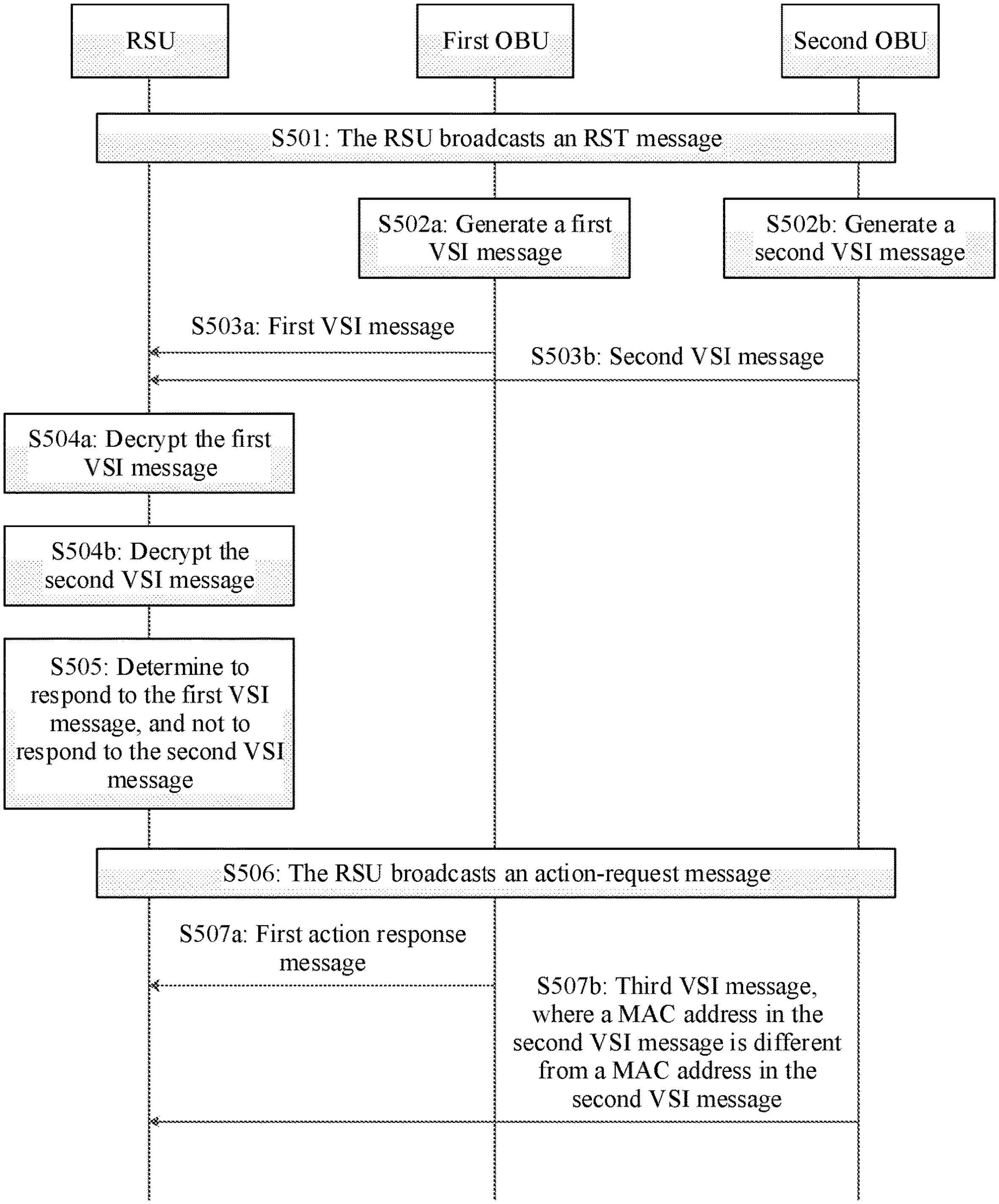
FIG. 5 is an example flowchart of a communication method according to a second embodiment of this application.

The following further describes in detail the communication method shown in FIG. 4 with reference to FIG. 5 by using an example in which a MAC address of a first OBU conflicts with a MAC address of a second OBU.

S501: An RSU broadcasts an RST message. OBUs receiving the RST message includes the first OBU and the second OBU.

**S502*a***: The first OBU generates a first VSI message, where the first VSI message carries a first MAC address and first ciphertext information that is obtained by encrypting the first information by using a first key.

For this step, refer to S302. Details are not described herein again.

**S503*a***: The first OBU sends the first VSI message. Correspondingly, the RSU receives the first VSI message.

**S504*a***: The RSU decrypts the first ciphertext information by using the first key in the first VSI message.

For this step, refer to S304. Details are not described herein again.

**S502*b***: The second OBU generates a second VSI message, where the second VSI message carries a second MAC address and second ciphertext information that is obtained by encrypting second information by using a second key.

For this step, refer to S302. Details are not described herein again.

**S503*b***: The second OBU sends the second VSI message. Correspondingly, the RSU receives the first VSI message.

**S504*b***: The RSU decrypts the second ciphertext information by using the second key in the second VSI message.

For this step, refer to S304. Details are not described herein again.

It may be understood that, performing **S502*b*, S503*b*, and S504*b* after S502*a*, S503*a*, and S504*a* herein is merely an example. A sequence of performing S502*b*, S503*b* and S504*b* and performing S502*a*, S503*a*, and S504*a*** is not limited in this application.

S505: The RSU determines to respond to the first VSI message, and determines not to respond to the second VSI message. Determining, by the RSU, to respond to the first VSI message may be understood as sending a first action-request message corresponding to the first VSI message, and determining not to respond to the second VSI message may be understood as not sending a second action-request message corresponding to the second VSI message. For this step, refer to S405.

In an example, when receiving the first VSI message and the second VSI message within first preset duration, the RSU determines whether the MAC addresses in the first VSI message and the second VSI message are the same. An example of the first preset duration is dozen-odd milliseconds.

The RSU receiving the first VSI message and the second VSI message within first preset duration may be understood as a time interval between a time at which the RSU receives the first VSI message and a time at which the RSU receives the second VSI message being less than or equal to the first preset duration.

In this embodiment, the time at which the RSU receives the first VSI message is earlier than the time at which the RSU receives the second VSI message; or a quantity of VSI messages received by the RSU from the first OBU within first preset duration is greater than a quantity of VSI messages received by the RSU from the second OBU within the first preset duration; or a priority of the first OBU is higher than a priority of the second OBU; or a priority of a service corresponding to the first VSI message is higher than a priority of a service corresponding to the second VSI message; a user priority of the first OBU is higher than a user priority of the second OBU. Therefore, the RSU determines to respond to the first VSI message and determines not to respond to the second VSI message, that is, the RSU determines to send the first action-request message and determines not to send the second action-request message, where the first action-request message carries the first MAC address and the ciphertext information that is encrypted by using the first key of the first OBU, and the second action-request message carries the second MAC address and the ciphertext information that is encrypted by using the second key of the second OBU.

S506: The RSU broadcasts the first action-request message, where the first action-request message carries the first MAC address and third ciphertext information that is obtained by encrypting third information by using the first key. The first OBU and the second OBU receive the first action-request message.

S507*a*: The first OBU sends a first action response message based on the first action-request message.

Specifically, the first OBU determines whether a MAC address carried in the first action-request message is the same as the first MAC address of the first OBU. Because the MAC address carried in the first action-request message is the same as the first MAC address of the first OBU, the first OBU decrypts the third ciphertext information in the first action-request message by using the first key of the first OBU.

Because the third ciphertext information in the first action-request message is ciphertext information obtained by the RSU through encryption by using the first key, the first OBU can successfully decrypt the ciphertext information, to send the first action response message.

For related content of sending the first action response message by the first OBU, refer to S307. Details are not described herein again.

S507*b*: The second OBU sends the second VSI message based on the first action-request message, where the second VSI message carries a third MAC address and fourth ciphertext information obtained by encrypting the second information by using the third key, and the third MAC address is different from the second MAC address.

Specifically, the second OBU determines whether the MAC address carried in the first action-request message is the same as the second MAC address of the second OBU. Because the MAC address carried in the first action-request message is the same as the second MAC address of the first OBU, the first OBU decrypts the third ciphertext information in the first action-request message by using the first key of the first OBU.

Because the third ciphertext information in the first action-request message is obtained by the RSU through encryption by using the first key, the second OBU fails in decryption, and sends the second VSI message.

The third MAC address may be a reserved MAC address, or may be a MAC address determined by the OBU based on the second MAC address and according to a preset rule.

In an example, the OBU may add a preset value to the second MAC address, to obtain the third MAC address. For example, the preset value may be 1.

Optionally, when verification of the MAC address in the first action-request message succeeds and decryption, by using the second key, of the third ciphertext information in the first action-request message fails, the second OBU may wait for the preset duration. The second OBU sends the second VSI only when the second OBU does not receive, within the preset duration, an action-request message with the MAC address that can be verified successfully and the ciphertext information that can be successfully decrypted by using the second key. In this implementation, reliability of successfully receiving a second action-request message by the second OBU can be improved, and resources are not wasted.

Figure 6:
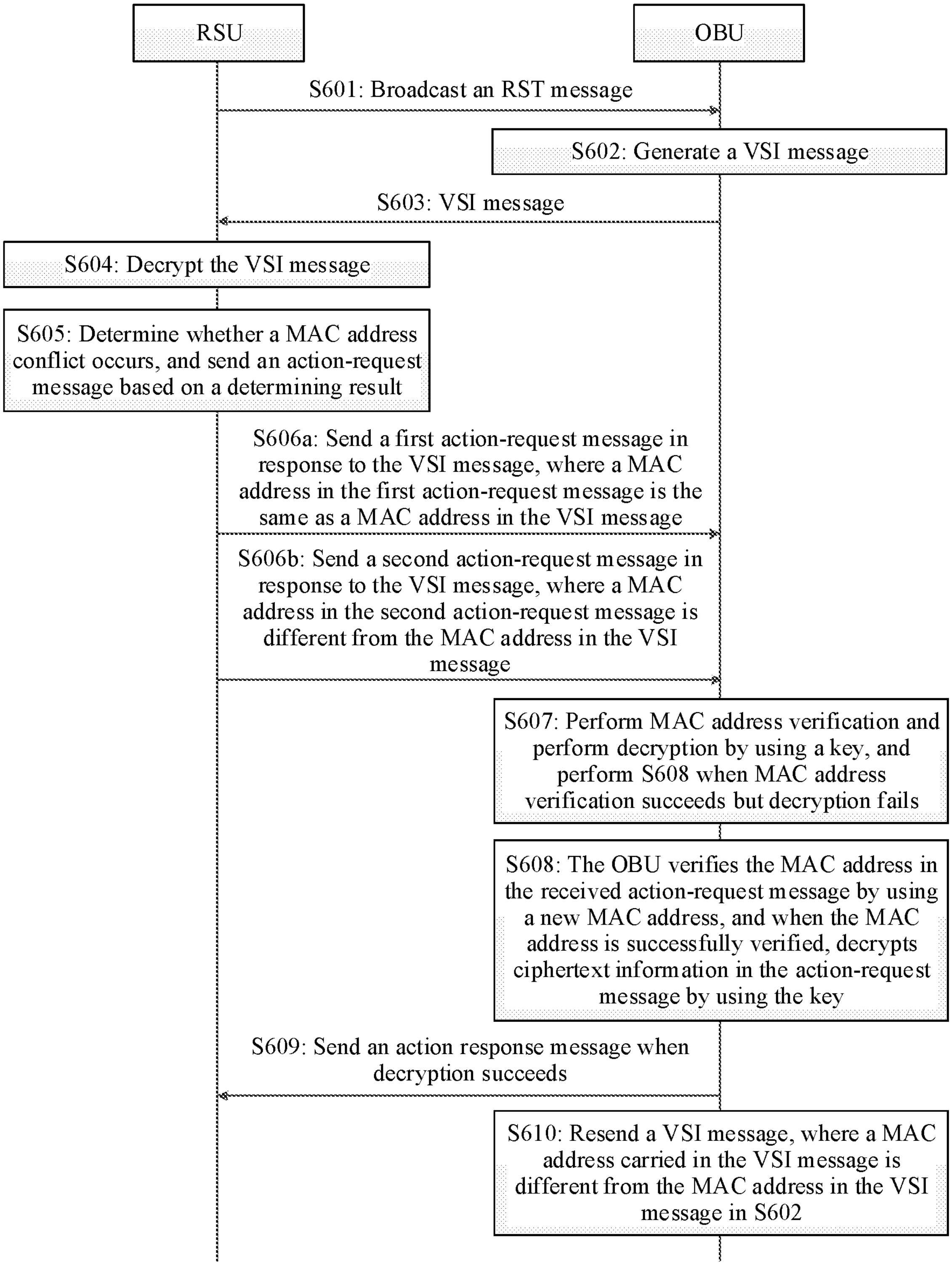
FIG. 6 is an example flowchart of a communication method according to a third embodiment of this application.

FIG. 6 is an example flowchart of a communication method according to another embodiment of this application. As shown in FIG. 6, the method includes steps S601 to S609.

S601: An RSU broadcasts an RST message.

For this step, refer to S301. Details are not described herein again.

S602: An OBU receiving the RST message generates a VSI message, where the VSI message carries a MAC address of the OBU, a key of the OBU, and ciphertext information obtained by encrypting to-be-encrypted information by using the key of the OBU.

For this step, refer to S302. Details are not described herein again.

S603: The OBU sends the VSI message. Correspondingly, the RSU receives the VSI message.

S604: The RSU decrypts the ciphertext information in the VSI message by using the key in the VSI message. For this step, refer to S304. Details are not described herein again.

S605: The RSU determines whether the MAC address in the VSI message conflicts with a MAC address in another VSI message, and determines, based on a determining result, to send a first action-request message and a second action-request message in response to the VSI message. If the RSU determines to send the first action-request message in response to the VSI message, S606*a* is performed. If the RSU determines to send the second action-request message in response to the VSI message, S606*b* is performed.

The first action-request message carries the MAC address in the VSI message and key information obtained through encryption by using the key in the VSI message. The second action-request message carries a new MAC address and the key information obtained through encryption by using the key in the VSI message.

In this embodiment, the first action-request message may be referred to as an action-request message corresponding to the VSI message. For an implementation in which the RSU determines whether to send a corresponding action-request message in response to the VSI message, refer to related content in S405. Details are not described herein again.

S606*a*: The RSU sends the first action-request message, where the first action-request message carries the MAC address in the corresponding VSI message and the ciphertext information that is obtained through encrypting the to-be-encrypted information of the RSU by using the key in the corresponding VSI message. Correspondingly, the OBU receives the first action-request message.

For this step, refer to S305. Details are not described herein again.

S606*b*: The RSU sends the second action-request message, where the second action-request message carries the new MAC address and the key information obtained through encryption by using the key in the VSI message. The new MAC address herein refers to a MAC address different from the MAC address in the VSI message.

Optionally, the new MAC address may be a reserved MAC address, or may be a MAC address determined by the RSU based on the original MAC address and according to a preset rule.

In an example, the RSU may add a preset value to the original MAC address, to obtain the new MAC address. For example, the preset value may be 1.

S607: The OBU performs S608 when verification of the MAC address in the action-request message succeeds and decryption, by using the key of the OBU, of the ciphertext information in the action-request message fails. For this step, refer to S407. Details are not described herein again.

For example, if the OBU is an OBU other than an OBU corresponding to the first action-request message, the OBU performs S608.

In an example, when verification of the MAC address in the action-request message succeeds and decryption, by using the key of the OBU, of the ciphertext information in the action-request message fails, the OBU may wait for the preset duration. The OBU performs S608 only when the OBU does not receive, within the preset duration, an action-request message with the MAC address that can be verified successfully and the ciphertext information that can be successfully decrypted by using the key of the OBU. This is because a currently received action-request message may include a tampered MAC address, and the action-request message corresponding to the OBU may subsequently arrive at the OBU.

Optionally, the OBU performs S609 when verification of the MAC address in the action-request message succeeds and decryption, by using the key of the OBU, of the ciphertext information in the action-request message succeeds.

For example, if the OBU is the OBU corresponding to the first action-request message, the OBU performs S609.

Optionally, when verification of the MAC address in the action-request message fails, the OBU performs S610. For this step, refer to S407. Details are not described herein again.

Optionally, when verification performed by the OBU on signature information of the action-request message by using a public key of a certificate of the RSU fails, the OBU perform s S610. For this step, refer to S407. Details are not described herein again.

S608: The OBU verifies the MAC address in the received action-request message by using the new MAC address, and when the MAC address is successfully verified, decrypts the ciphertext information in the action-request message by using the key.

In an example, the OBU may verify the MAC address in the received action-request message with the reserved MAC address.

In another example, the OBU may determine the new MAC address based on the preset rule and the MAC address used by the OBU in S602, and verify the MAC address in the received action-request message with the new MAC address.

The OBU may add a preset value to the MAC address used in S602, to obtain a new MAC address. An example of the preset value is 1.

In this step, if the OBU successfully decrypts the ciphertext information in the action-request message by using the key of the OBU, the OBU may perform S609. If the OBU fails to decrypt the ciphertext information in the action-request message by using the key of the OBU, the OBU may perform S610.

For example, when the OBU is an OBU that sends the VSI message corresponding to the second action-request message, the OBU successfully decrypts the ciphertext information in the second action-request message by using the key of the OBU, and then performs S609.

In an example, when verification of the MAC address in the OBU action-request message succeeds and decryption, by using the key of the OBU, of the ciphertext information in the action-request message fails, the OBU may wait for preset duration. The OBU performs S610 only when the OBU does not receive, within the preset duration, an action-request message with the MAC address that can be verified successfully and the ciphertext information that can be successfully decrypted by using the key of the OBU. This is because a currently received action-request message may include a tampered MAC address, and the action-request message corresponding to the OBU may subsequently arrive at the OBU.

In this step, optionally, when verification of the MAC address in the action-request message fails, the OBU performs S610.

In an example, when verification of the MAC address in the OBU action-request message fails, the OBU may wait for the preset duration. The OBU performs S610 only when the OBU does not receive, within the preset duration, an action-request message with the MAC address that can be verified successfully and the ciphertext information that can be successfully decrypted by using the key of the OBU. This is because a currently received action-request message may include a tampered MAC address, and the action-request message corresponding to the OBU may subsequently arrive at the OBU. In this implementation, reliability of successfully receiving a corresponding action-request message by the OBU can be improved, and resources are not wasted.

It may be understood that, in this embodiment, the OBU may store all action-request messages received within the preset duration. When the OBU successfully decodes a MAC address of any action-request message by using an original MAC address of the OBU, but cannot successfully decode ciphertext information in the action message by using the key of the OBU, the OBU may use a new MAC address to perform MAC address verification on another stored action-request message or a newly received action-request message.

S609: The OBU sends an action response message based on the action-request message. For this step, refer to S307. Details are not described herein again.

S610: The OBU resends a VSI message, where a MAC address carried in the resent VSI message is different from the MAC address in the VSI message sent earlier. For this step, refer to S408. Details are not described herein again.

It may be understood that the communication method shown in FIG. 6 may include more, fewer, or alternative steps. For example, the communication method in this embodiment may not include S610.

Figure 7:
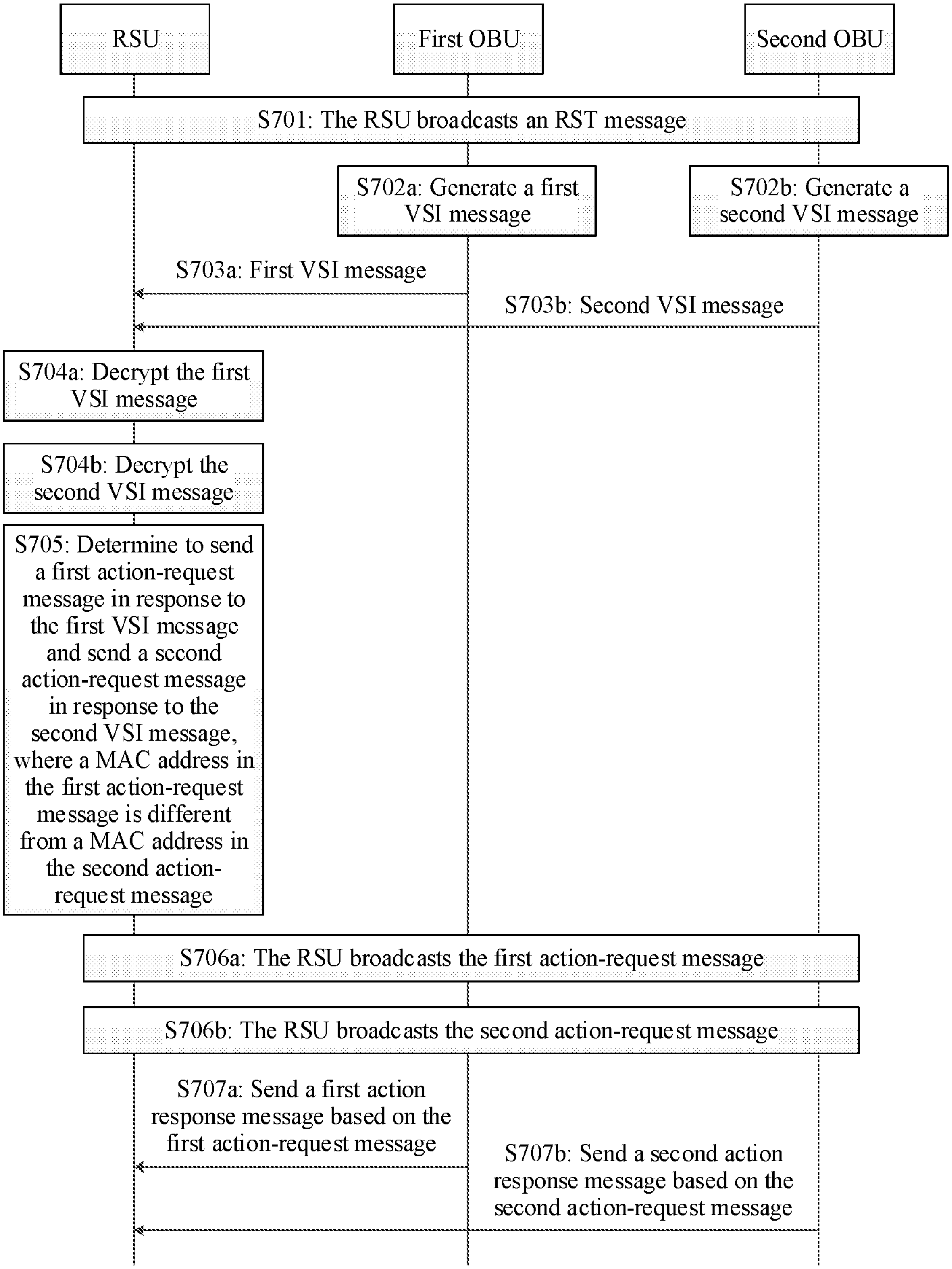
FIG. 7 is an example flowchart of a communication method according to a fourth embodiment of this application.

The following further describes in detail the communication method shown in FIG. 6 with reference to FIG. 7 by using an example in which a MAC address of a first OBU conflicts with a MAC address of a second OBU.

S701: An RSU broadcasts an RST message. OBUs receiving the RST message includes the first OBU and the second OBU.

S702*a*: The first OBU generates a first VSI message, where the first VSI message carries a first MAC address and first ciphertext information that is obtained by encrypting the first information by using a first key.

For this step, refer to S302. Details are not described herein again.

S703*a*: The first OBU sends the first VSI message. Correspondingly, the RSU receives the first VSI message.

S704*a*: The RSU decrypts the first ciphertext information in the first VSI message by using the first key in the first VSI message.

For this step, refer to S304. Details are not described herein again.

S702*b*: The second OBU generates a second VSI message, where the second VSI message carries a second MAC address and second ciphertext information that is obtained by encrypting second information by using a second key.

For this step, refer to S302. Details are not described herein again.

S703*b*: The second OBU sends the second VSI message. Correspondingly, the RSU receives the first VSI message.

S704*b*: The RSU decrypts the ciphertext information in the second VSI message by using the second key in the second VSI message.

For this step, refer to S304. Details are not described herein again.

It may be understood that, performing S702*b*, S703*b*, and S704*b* after S702*a*, S703*a*, and S704*a* herein is merely an example. A sequence of performing S702*b*, S703*b* and S704*b* and performing S702*a*, S703*a*, and S704*a* is not limited in this application.

S705: The RSU determines to send a first action-request message in response to the first VSI message, and determines to send a second action-request message in response to the second VSI message, where the first action-request message carries the first MAC address and third ciphertext information obtained by encrypting third information by using the first key, and the second action information carries a third MAC address and fourth ciphertext information obtained through encrypting fourth information by using the second key.

In an example, when receiving the first VSI message and the second VSI message within first preset duration, the RSU determines whether the MAC addresses in the first VSI message and the second VSI message are the same. An example of the first preset duration is dozen-odd milliseconds.

The RSU receiving the first VSI message and the second VSI message within first preset duration may be understood as a time interval between a time at which the RSU receives the first VSI message and a time at which the RSU receives the second VSI message being less than or equal to the first preset duration.

In this embodiment, the time at which the RSU receives the first VSI message is earlier than the time at which the RSU receives the second VSI message; or a quantity of VSI messages received by the RSU from the first OBU within first preset duration is greater than a quantity of VSI messages received by the RSU from the second OBU within the first preset duration; or a priority of the first OBU is higher than a priority of the second OBU; or a priority of a service corresponding to the first VSI message is higher than a priority of a service corresponding to the second VSI message; a user priority of the first OBU is higher than a user priority of the second OBU. Therefore, the RSU determines to respond to the first VSI message and determines not to respond to the second VSI message, that is, the RSU determines to send the first action-request message and determines not to send the second action-request message, where the first action-request message carries the first MAC address and the ciphertext information that is encrypted by using the first key of the first OBU, and the second action-request message carries the second MAC address and the ciphertext information that is encrypted by using the second key of the second OBU.

S706*a*: The RSU broadcasts the first action-request message.

S706*b*: The RSU broadcasts the second action-request message.

A sequence of S706*a* and S706*b* is not limited in this embodiment.

S707*a*: The first OBU sends a first action response message based on the first action-request message.

For related content of sending, by the first OBU, the first action response message based on the first action-request message, refer to related content of sending, by the OBU, the action response message based on the action-request message in S307. Details are not described herein again.

Optionally, after receiving the second action-request message, the first OBU ignores the second action-request message because MAC address verification fails.

S707*b*: The second OBU successfully verifies the MAC address in the first action-request message with the second MAC address while decryption of the third ciphertext information in the first action-request message with the second key fails; performs MAC address verification on the second action-request message with the third MAC address; successfully verifies the MAC address in the second action-request message with the third MAC address; and sends the second action response message based on the second action-request message.

For related content of sending, by the second OBU, the second action response message based on the second action-request message, refer to related content of sending, by the OBU, the action response message based on the action-request message in S307. Details are not described herein again.

Optionally, because verification of the MAC address of the first action-request message fails, the second OBU ignores the second action-request message.

A sequence of S707*a* and S707*b* is not limited in this embodiment.

Figure 8:
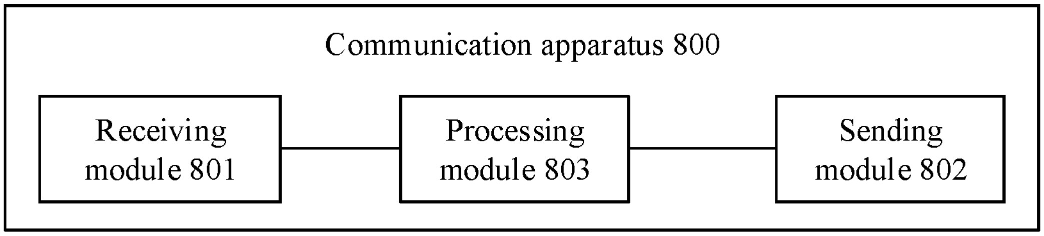
FIG. 8 is an example diagram of a structure of a communication apparatus according to a first embodiment of this application.

FIG. 8 is a schematic diagram of a structure of a communication apparatus according to a first embodiment of this application. As shown in FIG. 8, the communication apparatus 1800 includes a receiving module 801, a sending module 802, and a processing module 803.

The communication apparatus 800 may be configured to perform a communication method implemented by an RSU or any OBU in the communication method shown in any one of FIG. 4 to FIG. 7.

In a first example, the communication apparatus 800 may be configured to implement the communication method implemented by the RSU in the embodiment shown in FIG. 4. The receiving module 801 may be configured to perform operations performed by the RSU in S404 and S409. The sending module 802 may be configured to perform steps performed by the RSU in S401 and S406. The processing module 803 may be configured to perform S404 and S405.

In a second example, the communication apparatus 800 may be configured to implement the communication method implemented by the OBU in the embodiment shown in FIG. 4. The receiving module 801 may be configured to perform steps performed by the OBU in S401 and S406. The sending module 802 may be configured to perform operations performed by the OBU in S403 and S409. The processing module 803 may be configured to perform S407 and S408.

In a third example, the communication apparatus 800 may be configured to implement the communication method implemented by the RSU in the embodiment shown in FIG. 6. The receiving module 801 may be configured to perform operations performed by the RSU in S603 and S609. The sending module 802 may be configured to perform steps performed by the RSU in S601, S606*a*, and S606*b*. The processing module 803 may be configured to perform S604 and S605.

In a fourth example, the communication apparatus 800 may be configured to implement the communication method implemented by the OBU in the embodiment shown in FIG. 6. The receiving module 801 may be configured to perform steps performed by the OBU in S601, S606*a*, and S606*b*. The sending module 802 may be configured to perform operations performed by the OBU in S603 and S609. The processing module 803 may be configured to perform S607, S608, and S610.

Figure 9:
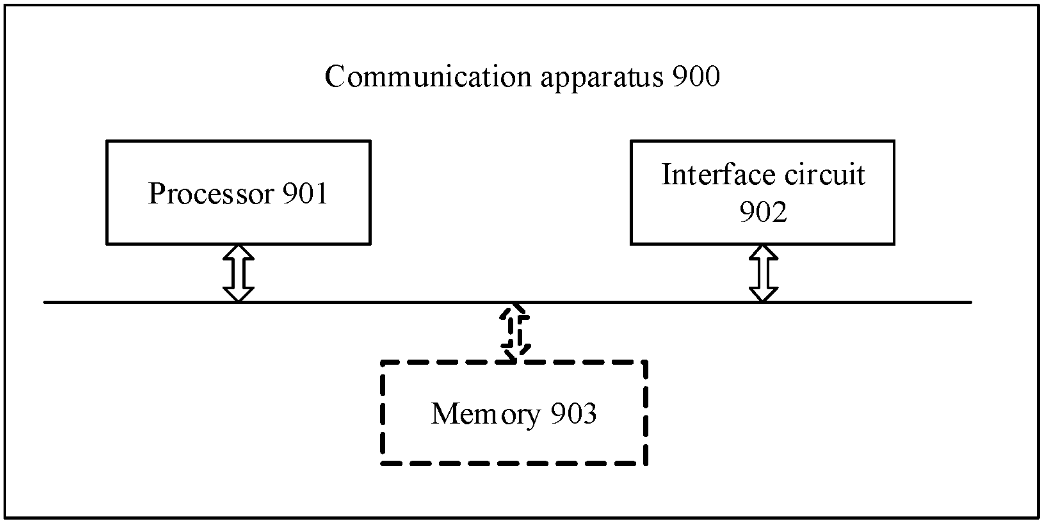
FIG. 9 is an example diagram of a structure of a communication apparatus according to a second embodiment of this application.

FIG. 9 is a schematic diagram of a structure of a communication apparatus according to another embodiment of this application. As shown in FIG. 9, the communication apparatus 900 includes a processor 901 and an interface circuit 902. The processor 901 and the interface circuit 902 are coupled to each other. It may be understood that the interface circuit 902 may be a transceiver or an input/output interface.

Optionally, the communication apparatus 900 may further include a memory 903, configured to store instructions executed by the processor 901, store input data used by the processor 901 to run the instructions, or store data generated after the processor 901 runs the instructions.

The communication apparatus 900 may be configured to implement the communication method implemented by any device in any embodiment shown in FIG. 4 to FIG. 7.

The communication apparatus 900 may be a communication device, or may be a chip applied to the communication device. For example, the communication device 900 may be an RSU, or may be a chip applied to the RSU. For example, the communication device 900 may be an OBU, or may be a chip applied to the OBU.

It may be understood that, the processor in embodiments of this application may be a central processing unit (CPU), or may be another general-purpose processor, a digital signal processor (DSP), an application-specific integrated circuit (ASIC), a field-programmable gate array (FPGA) or another programmable logic device, a transistor logic device, a hardware component, or any combination thereof. The general-purpose processor may be a microprocessor or any regular processor.

The method steps in embodiments of this application may be implemented by using hardware, or may be implemented by the processor executing software instructions. The software instructions may include a corresponding software module. The software module may be stored in a random-access memory (RAM), a flash memory, a read-only memory (ROM), a programmable read-only memory (PROM), an erasable programmable read-only memory (EPROM), an electrically erasable programmable read-only memory (EEPROM), a register, a hard disk drive, a removable hard disk, a compact-disk read-only memory (CD-ROM), or any other form of storage medium well-known in the art. For example, a storage medium is coupled to a processor, so that the processor can read information from the storage medium and write information into the storage medium. The storage medium may be a component of the processor. The processor and the storage medium may be disposed in an ASIC. In addition, the ASIC may be located in a network device or a terminal device. The processor and the storage medium may alternatively exist as discrete components in a network device or a terminal device.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a dedicated computer, a computer network, a network device, user equipment, or another programmable apparatus. The computer program or instructions may be stored in a computer-readable storage medium, or may be transmitted from a computer-readable storage medium to another computer-readable storage medium. For example, the computer program or instructions may be transmitted from a website, computer, server, or data center to another website, computer, server, or data center in a wired manner or in a wireless manner. The computer-readable storage medium may be any usable medium that can be accessed by a computer, or a data storage device, such as a server or a data center, integrating one or more usable media. The usable medium may be a magnetic medium, for example, a floppy disk, a hard disk drive, or a magnetic tape; or may be an optical medium, for example, a digital video disc; or may be a semiconductor medium, for example, a solid-state drive (SSD).

In embodiments of this application, unless otherwise stated or there is a logic conflict, terms and/or descriptions between different embodiments are consistent and may be mutually referenced, and technical features in different embodiments may be combined into a new embodiment based on an internal logical relationship thereof.

In this application, "at least one" means one or more, and "a plurality of" means two or more. The term "and/or" describes an association relationship between associated objects and represents that three relationships may exist. For example, A and/or B may indicate the following cases: Only A exists, both A and B exist, and only B exists, where A and B may be singular or plural. In the text descriptions of this application, the character "/" generally indicates an "or"

relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

What is claimed is:

1. A communication apparatus, comprising:
a memory configured to store program instructions; and
at least one processor coupled to the memory and configured to execute the instructions to cause the communication apparatus to:
receive a first vehicle service indication (VSI) message, wherein the first VSI message comprises a first media access control (MAC) address of a second device, a first key of the second device, and first ciphertext information based on encrypting first information of the second device using the first key;
receive a second VSI message, wherein the second VSI message comprises a second MAC address of a third device, a second key of the third device, and second ciphertext information based on encrypting second information of the third device using the second key, and wherein the first MAC address is the same as the second MAC address; and
send a first action-request message based on the first VSI message and the second VSI message, wherein the first action-request message comprises the first MAC address and third ciphertext information based on encrypting third information using the first key.

2. The communication apparatus of claim 1, wherein the at least one processor is further configured to execute the instructions to cause the communication apparatus to send the first action-request message based on the first VSI message and the second VSI message by:
refraining from sending any action-request message in response to the second VSI message; and
sending, in response to the first VSI message, the first action-request message.

3. The communication apparatus of claim 1, wherein the at least one processor is further configured to execute the instructions to cause the communications apparatus to send a second action-request message based on the first VSI message and the second VSI message, wherein the second action-request message comprises a third MAC address and fourth ciphertext information based on encrypting fourth information using the second key.

4. The communication apparatus of claim 3, wherein the third MAC address is a reserved MAC address.

5. The communication apparatus of claim 3, wherein the third MAC address is based on a preset rule and the second MAC address.

6. The communication apparatus of claim 1, wherein the communication apparatus receives the first VSI message at a first time and receives the second VSI message at a second time, wherein the first time is earlier than the second time, or
wherein a first quantity of VSI messages received by the communication apparatus from the second device within a first preset duration is greater than a second quantity of VSI messages received by the communication apparatus from the third device within the first preset duration,
wherein a priority of the second device is higher than a priority of the third device,
wherein a priority of a first service corresponding to the first VSI message is higher than a priority of a second service corresponding to the second VSI message, or
wherein a priority of a user of the second device is higher than a priority of a user of the third device.

7. The communication apparatus of claim 1, wherein an interval between a first time at which the communication apparatus receives the first VSI message and a second time at which the communication apparatus receives the second VSI message is less than or equal to second preset duration.

8. The communication apparatus of claim 1, wherein the first key is encrypted in the first VSI message or the second key is encrypted in the second VSI message.

9. A communication method, comprising:
receiving, by a first device, a first vehicle service indication (VSI) message, wherein the first VSI message comprises a first media access control (MAC) address of a second device, a first key of the second device, and first ciphertext information based on encrypting first information of the second device using the first key;
receiving, by the first device, a second VSI message, wherein the second VSI message comprises a second MAC address of a third device, a second key of the third device, and second ciphertext information based on encrypting second information of the third device using the second key, and wherein the first MAC address is the same as the second MAC address; and
sending, by the first device, a first action-request message based on the first VSI message and the second VSI message, wherein the first action-request message carries the first MAC address and third ciphertext information based on encrypting third information using the first key.

10. The method of claim 9, wherein sending the first action-request message based on the first VSI message and the second VSI message comprises:
refraining from sending, by the first device, any an action-request message that is in response to the second VSI message; and
sending, by the first device, the first action-request message in response to the first VSI message.

11. The method of claim 9, further comprising sending, by the first device, a second action-request message based on the first VSI message and the second VSI message, wherein the second action-request message comprises a third MAC address and fourth ciphertext information based on encrypting fourth information using the second key.

12. The method of claim 11, wherein the third MAC address is a reserved MAC address.

13. The method of claim 11, further comprising determining the third MAC address based on a preset rule and the second MAC address.

14. The method of claim 9, further comprising:
receiving the first VSI message at a first time and receiving the second VSI message at a second time, wherein the first time is earlier than the second time; or
receiving a first quantity of VSI messages from the second device within a first preset duration and receiving a second quantity of VSI messages from the third device within the first preset duration, wherein the first quantity is greater than the second quantity, or wherein a priority of the second device is higher than a priority of the third device, or wherein a priority of a first service corresponding to the first VSI message is higher than a priority of a second service corresponding to the second VSI message, or wherein a priority of a user of the second device is higher than a priority of a user of the third device.

15. The method of claim 9, wherein an interval between a first time at which the first device receives the first VSI message and a second time at which the first device receives the second VSI message is less than or equal to second preset duration.

16. The method of claim 9, wherein the first key is encrypted in the first VSI message or the second key is encrypted in the second VSI message.

17. A computer program product comprising instructions that are stored on a non-transitory computer-readable medium and that, when executed by a processor, cause a communication apparatus to:

receive a first vehicle service indication (VSI) message, wherein the first VSI message comprises a first media access control (MAC) address of a second device, a first key of the second device, and first ciphertext information based on encrypting first information of the second device using the first key;

receive a second VSI message, wherein the second VSI message comprises a second MAC address of a third device, a second key of the third device, and second ciphertext information based on encrypting second information of the third device using the second key, and wherein the first MAC address is the same as the second MAC address; and send a first action-request message based on the first VSI message and the second VSI message, wherein the first action-request message comprises the first MAC address and third ciphertext information based on encrypting third information using the first key.

18. The computer program product of claim 17, wherein the instructions, when executed by the processor, further cause the communication apparatus to send the first action-request message based on the first VSI message and the second VSI message by:

refraining from sending any action-request message in response to the second VSI message; and sending, in response to the first VSI message, the first action-request message.

19. The computer program product of claim 17, wherein the instructions, when executed by the processor, further cause the communication apparatus to send a second action-request message based on the first VSI message and the second VSI message, wherein the second action-request message comprises a third MAC address and fourth ciphertext information based on encrypting fourth information using the second key.

20. The computer program product of claim 19, wherein the third MAC address is a reserved MAC address.

21. The computer program product of claim 19, wherein the third MAC address is based on a preset rule and the second MAC address.

22. The computer program product of claim 17, wherein the communication apparatus receives the first VSI message at a first time and receives the second VSI message at a second time, wherein the first time is earlier than the second time, or wherein a first quantity of VSI messages received by the communication apparatus from the second device within a first preset duration is greater than a second quantity of VSI messages received by the communication apparatus from the third device within the first preset duration, wherein a priority of the second device is higher than a priority of the third device, wherein a priority of a first service corresponding to the first VSI message is higher than a priority of a second service corresponding to the second VSI message, or wherein a priority of a user of the second device is higher than a priority of a user of the third device.

23. The computer program product of claim 17, wherein an interval between a first time at which the communication apparatus receives the first VSI message and a second time at which the communication apparatus receives the second VSI message is less than or equal to second preset duration.

24. The computer program product of claim 17, wherein the first key is encrypted in the first VSI message or the second key is encrypted in the second VSI message.

* * * * *